(12) United States Patent
Sturges et al.

(10) Patent No.: US 11,953,901 B2
(45) Date of Patent: Apr. 9, 2024

(54) DETERMINING AUTONOMOUS VEHICLE ROUTES

(71) Applicant: UATC, LLC, San Francisco, CA (US)

(72) Inventors: Andrew Raymond Sturges, San Francisco, CA (US); Alexander Edward Chao, Oakland, CA (US); Yifang Liu, Burlingame, CA (US); Xiaodong Zhang, Pittsburgh, PA (US); Richard Brian Donnelly, Pittsburgh, PA (US); Bryan John Nagy, Allison Park, PA (US); Jeff Schneider, Pittsburgh, PA (US); Collin Christopher Otis, Canonsburg, PA (US)

(73) Assignee: UATC, LLC, San Francisco, CA (US)

( * ) Notice: Subject to any disclaimer, the term of this patent is extended or adjusted under 35 U.S.C. 154(b) by 376 days.

(21) Appl. No.: 16/866,701

(22) Filed: May 5, 2020

(65) Prior Publication Data

US 2020/0264613 A1 Aug. 20, 2020

Related U.S. Application Data

(62) Division of application No. 15/793,700, filed on Oct. 25, 2017, now Pat. No. 10,656,645.

(Continued)

(51) Int. Cl.
*G05D 1/00* (2006.01)
*G01C 21/34* (2006.01)

(52) U.S. Cl.
CPC ....... *G05D 1/0088* (2013.01); *G01C 21/3446* (2013.01); *G05D 1/0217* (2013.01)

(58) Field of Classification Search
CPC ............... G05D 1/0088; G05D 1/0217; G05D 2201/0213; G01C 21/3446;
(Continued)

(56) References Cited

U.S. PATENT DOCUMENTS 9,688,288 B1 * 6/2017 Lathrop ............. G01C 21/3697
10,324,463 B1 * 6/2019 Konrardy ............. G05D 1/0278
(Continued)

OTHER PUBLICATIONS

Siyuan Liu, Yisong Yue, and Ramayya Krishnan. Adaptive collective routing using gaussian process dynamic congestion models. In <i>Proceedings of the 19th ACM SIGKDD international conference on Knowledge discovery and data mining</i> (</i>KDD '13</i>). Association for Computing Machinery, New York, (Year: 2013).*

(Continued)

*Primary Examiner* — Elaine Gort
*Assistant Examiner* — Ellis B. Ramirez
(74) *Attorney, Agent, or Firm* — SCHWEGMAN LUNDBERG & WOESSNER, P.A.

(57) ABSTRACT

An autonomous vehicle includes one or more sensors for detecting an object in an environment surrounding the autonomous vehicle and a vehicle computing system comprising one or more processors receiving canonical route data associated with at least one canonical route, and controlling travel of the autonomous vehicle based on sensor data from the one or more sensors and the canonical route data associated with the at least one canonical route. The at least one canonical route comprises at least one roadway connected with another roadway in a plurality of roadways in a geographic location that satisfies at least one route optimization function derived based on trip data associated with one or more traversals of the plurality of roadways in a geographic location by one or more autonomous vehicles.

18 Claims, 10 Drawing Sheets

Related U.S. Application Data

(60) Provisional application No. 62/570,262, filed on Oct. 10, 2017.

(58) Field of Classification Search
CPC ............... G01C 21/3484; G01C 21/3658; G01C 21/20; G01C 21/3822; G01C 21/3811; G01C 21/3841; B60W 2554/20; B60W 2554/40; B60W 2554/60; B60W 30/10; B60W 40/06; B60W 60/0015; G01S 13/867; G01S 2013/93271
USPC .................. 701/25, 423, 424, 425
See application file for complete search history.

(56) References Cited

U.S. PATENT DOCUMENTS

| | | | |
|---|---|---|---|
| 10,656,645 B1 | 5/2020 | Sturges et al. | |
| 2002/0120396 A1* | 8/2002 | Boies | G06Q 10/047 701/424 |
| 2005/0216182 A1* | 9/2005 | Hussain | G01C 21/20 701/532 |
| 2010/0312466 A1* | 12/2010 | Katzer | G08G 1/096827 701/533 |
| 2011/0301837 A1* | 12/2011 | Wellmann | G01C 21/3446 701/410 |
| 2013/0013599 A1* | 1/2013 | Lindstrom | G01C 21/32 707/737 |
| 2016/0167652 A1* | 6/2016 | Slusar | B60W 30/09 701/27 |
| 2016/0178377 A1* | 6/2016 | Jung | G01S 19/13 |
| 2017/0138754 A1* | 5/2017 | Rowley | G01C 21/3484 |
| 2017/0219364 A1* | 8/2017 | Lathrop | G01C 21/36 |
| 2017/0356751 A1* | 12/2017 | Iagnemma | G05D 1/0214 |
| 2017/0363430 A1* | 12/2017 | Al-Dahle | G05D 1/0212 |
| 2018/0025235 A1* | 1/2018 | Fridman | H04N 7/18 382/103 |
| 2019/0086219 A1* | 3/2019 | Hashisho | G01C 21/20 |
| 2021/0278234 A1* | 9/2021 | Sheha | G01C 21/3484 |

OTHER PUBLICATIONS

"U.S. Appl. No. 15/793,700, Notice of Allowance dated Jan. 14, 2020", 8 pgs.

"U.S. Appl. No. 15/793,700, Final Office Action dated Oct. 4, 2019", 15 pgs.

"U.S. Appl. No. 15/793,700, Examiner Interview Summary dated Nov. 13, 2019", 3 pgs.

"U.S. Appl. No. 15/793,700, Restriction Requirement dated Apr. 8, 2019", 6 pgs.

"U.S. Appl. No. 15/793,700, Response filed May 24, 2019 to Restriction Requirement dated Apr. 8, 2019", 2 pgs.

"U.S. Appl. No. 15/793,700, Non Final Office Action dated Jun. 27, 2019", 14 pgs.

"U.S. Appl. No. 15/793,700, Examiner Interview Summary dated Jul. 30, 2019", 3 pgs.

"U.S. Appl. No. 15/793,700, Response filed Sep. 11, 2019 to Non Final Office Action dated Jun. 27, 2019", 15 pgs.

"U.S. Appl. No. 15/793,700, Response filed Dec. 6, 2019 to Final Office Action dated Oct. 4, 2019", 15 pgs.

U.S. Appl. No. 15/793,700 U.S. Pat. No. 10,656,645, filed Oct. 25, 2017, Determining Autonomous Vehicle Routes.

\* cited by examiner

DETERMINING AUTONOMOUS VEHICLE ROUTES

CROSS REFERENCE TO RELATED APPLICATIONS

This application is a divisional of U.S. patent application Ser. No. 15/793,700, filed on Oct. 25, 2017, which claims the benefit of U.S. Provisional Application No. 62/570,262, filed Oct. 10, 2017, all of which are hereby incorporated by reference in their entireties.

BACKGROUND

An autonomous vehicle (e.g., a driverless car, a driverless auto, a self-driving car, a robotic car, etc.) is a vehicle that is capable of sensing an environment of the vehicle and traveling (e.g., navigating, moving, etc.) in the environment without human input. An autonomous vehicle uses a variety of techniques to detect the environment of the autonomous vehicle, such as radar, laser light, Global Positioning System (GPS), odometry, and/or computer vision. In some instances, an autonomous vehicle uses a control system to interpret information received from one or more sensors, to identify a route for traveling, to identify an obstacle in a route, and to identify relevant traffic signs associated with a route.

SUMMARY

According to some non-limiting embodiments or aspects, provided is a method for determining a canonical route including: receiving, with a computing system including one or more processors, trip data associated with one or more traversals of a plurality of roadways in a geographic location by one or more autonomous vehicles; generating, with the computing system, at least one canonical route based on the trip data, wherein the at least one canonical route includes at least one roadway connected with another roadway in the plurality of roadways; and providing, with the computing system, canonical route data associated with the at least one canonical route to an autonomous vehicle for controlling travel of the autonomous vehicle on the at least one canonical route.

In some non-limiting embodiments or aspects, the method further comprises receiving, with the computing system, map data associated with a map of the geographic location; and determining, with the computing system, the plurality of roadways in the geographic location based on the map data and autonomy criteria, wherein the autonomy criteria is associated with an indication of whether the autonomous vehicle can travel on the plurality of roadways.

In some non-limiting embodiments or aspects, the trip data comprises at least one of the following: a number of interventions associated with the one or more traversals of the plurality of roadways in the geographic location by the one or more autonomous vehicles, a number of hazards associated with the one or more traversals of the plurality of roadways in the geographic location by the one or more autonomous vehicles, or any combination thereof.

In some non-limiting embodiments or aspects of the method, generating the at least one canonical route comprises: determining, with the computing system, the at least one canonical route based on at least one objective function derived from the trip data.

In some non-limiting embodiments or aspects of the method, generating the at least one canonical route comprises: determining, with the computing system, a subset of roadways of the plurality of roadways associated with trip data that satisfies a threshold value, wherein each roadway of the subset of roadways must be traversed in a route; determining, with the computing system, a shortest path between each pair of roadways of the subset of roadways; determining, with the computing system, a shortest route in the subset of roadways that includes each roadway of the subset of roadways; determining, with the computing system, a shortest route in the plurality of roadways based on an order of the subset of roadways in the shortest route of the subset of roadways and the shortest path between each pair of roadways in the subset of roadways; and wherein the at least one canonical route comprises roadways in the shortest route in the plurality of roadways.

In some non-limiting embodiments or aspects method, generating the at least one canonical route comprises: determining, with the computing system, a trimmed set of roadways of the plurality of roadways associated with trip data that satisfies a threshold value, wherein each roadway of the trimmed set of roadways must not be traversed in a route; determining, with the computing system, a subset of roadways based on the trimmed set of roadways, wherein the subset of roadways comprises a largest strongly connected set of roadways remaining after removing the trimmed set of roadways from the plurality of roadways; determining, with the computing system, a shortest path between pairs of roadways in the subset of roadways; determining, with the computing system, for each of a plurality of random subsets of roadways in the subset of roadways, a shortest route that includes each roadway of that random subset of roadways; applying, with the computing system, an objective function derived based on the trip data to each of the shortest routes determined for each random subset of the plurality of random subsets of roadways to determine an objective function value for that shortest route; determining, with the computing system, a preferred subset of roadways based on the objective function values of the plurality of shortest routes; and determining, with the computing system, a shortest route in the plurality of roadways based on an order of the preferred subset of roadways and the shortest path between each pair of roadways in the subset of roadways, wherein the at least one canonical route comprises roadways in the shortest route in the plurality of roadways.

In some non-limiting embodiments or aspects of the method, generating the at least one canonical route comprises: determining, with the computing system, a subset of roadways of the plurality of roadways based on the trip data and at least one threshold; determining, with the computing system, a shortest path between pairs of roadways in the subset of roadways; determining, with the computing system, for each of a plurality of random subsets of roadways in the subset of roadways, a shortest route that includes each roadway of that random subset of roadways; determining, with the computing system, for each of the plurality of random subsets of roadways, a shortest route in the plurality of roadways based on an order of that random subset of roadways in the shortest route and the shortest path between pairs of roadways; applying, with the computing system, an objective function derived based on the trip data to each of the shortest routes determined in the plurality of roadways to determine an objective function value for that shortest route; and determining, with the computing system, the at least one canonical route based on the objective function values of the shortest routes in the plurality of roadways.

According to some non-limiting embodiments or aspects, provided is a computer program product including at least one non-transitory computer-readable medium including one or more instructions that, when executed by at least one processor, cause the at least one processor to: receive trip data associated with one or more traversals of a plurality of roadways in a geographic location by one or more autonomous vehicles; generate at least one canonical route based on the trip data, wherein the at least one canonical route includes at least one roadway connected with another roadway in the plurality of roadways; and provide canonical route data associated with the at least one canonical route to an autonomous vehicle for controlling travel of the autonomous vehicle on the at least one canonical route.

In some non-limiting embodiments or aspects, the computer program product includes further instructions that cause the at least one processor to receive map data associated with a map of the geographic location; and determine the plurality of roadways in the geographic location based on the map data and autonomy criteria, wherein the autonomy criteria is associated with an indication of whether the autonomous vehicle can travel on the plurality of roadways.

In some non-limiting embodiments or aspects, the computer program product includes further instructions that cause the at least one processor to determine the at least one canonical route based on at least one objective function derived from the trip data.

In some non-limiting embodiments or aspects, the computer program product includes further instructions that cause the at least one processor to determine a subset of roadways of the plurality of roadways associated with trip data that satisfies a threshold value, wherein each roadway of the subset of roadways must be traversed in a route; determine a shortest path between each pair of roadways of the subset of roadways; determine a shortest route in the subset of roadways that includes each roadway of the subset of roadways; and determine a shortest route in the plurality of roadways based on an order of the subset of roadways in the shortest route of the subset of roadways and the shortest path between each pair of roadways in the subset of roadways, wherein the at least one canonical route comprises roadways in the shortest route in the plurality of roadways.

In some non-limiting embodiments or aspects, the computer program product includes further instructions that cause the at least one processor to determine a trimmed set of roadways of the plurality of roadways associated with trip data that satisfies a threshold value, wherein each roadway of the trimmed set of roadways must not be traversed in a route; determine a subset of roadways based on the trimmed set of roadways, wherein the subset of roadways comprises a largest strongly connected set of roadways remaining after removing the trimmed set of roadways from the plurality of roadways; determine a shortest path between pairs of roadways in the subset of roadways; determine, for each of a plurality of random subsets of roadways in the subset of roadways, a shortest route that includes each roadway of that random subset of roadways to produce a plurality of shortest routes; apply an objective function derived based on the trip data to the shortest route of each random subset of the plurality of random subsets of roadways to determine an objective function value for that shortest route; and determine a preferred subset of roadways based on the shortest route of the plurality of shortest routes determined for the plurality of random subsets that best satisfies the objective function; determine a shortest route in the plurality of roadways based on an order of the preferred subset of roadways and the shortest path between each pair of roadways in the subset of roadways, wherein the at least one canonical route comprises roadways in the shortest route in the plurality of roadways.

According to some non-limiting embodiments, provided is a computing system including: one or more processors; a computer system implemented at least in part by the one or more processors, the computer system to: receive trip data associated with one or more traversals of a plurality of roadways in a geographic location by one or more autonomous vehicles; generate at least one canonical route based on the trip data, wherein the at least one canonical route includes at least one roadway connected with another roadway in the plurality of roadways; and provide canonical route data associated with the at least one canonical route to an autonomous vehicle for controlling travel of the autonomous vehicle on the at least one canonical route.

In some non-limiting embodiments or aspects, the one or more processors are further configured to receive map data associated with a map of the geographic location; and determine the plurality of roadways in the geographic location based on the map data and autonomy criteria, wherein the autonomy criteria is associated with an indication of whether the autonomous vehicle can travel on the plurality of roadways.

In some non-limiting embodiments or aspects, the one or more processors are further configured to determine the at least one canonical route based on at least one objective function derived from the trip data.

In some non-limiting embodiments or aspects, the one or more processors are further configured to determine a subset of roadways of the plurality of roadways associated with trip data that satisfies a threshold value, wherein each roadway of the subset of roadways must be traversed in a route; determine a shortest path between each pair of roadways of the subset of roadways; determine a shortest route in the subset of roadways that includes each roadway of the subset of roadways; and determine a shortest route in the plurality of roadways based on an order of the subset of roadways in the shortest route of the subset of roadways and the shortest path between each pair of roadways in the subset of roadways, wherein the at least one canonical route comprises roadways in the shortest route in the plurality of roadways.

In some non-limiting embodiments or aspects, the one or more processors are further configured to determine a trimmed set of roadways of the plurality of roadways associated with trip data that satisfies a threshold value, wherein each roadway of the trimmed set of roadways must not be traversed in a route; determine a subset of roadways based on the trimmed set of roadways, wherein the subset of roadways comprises a largest strongly connected set of roadways remaining after removing the trimmed set of roadways from the plurality of roadways; determine a shortest path between pairs of roadways in the subset of roadways; determine, for each of a plurality of random subsets of roadways in the subset of roadways, a shortest route that includes each roadway of that random subset of roadways to produce a plurality of shortest routes; apply an objective function derived based on the trip data to the shortest route of each random subset of the plurality of random subsets of roadways to determine an objective function value for that shortest route; and determine a preferred subset of roadways based on the shortest route of the plurality of shortest routes determined for the plurality of random subsets that best satisfies the objective function; determine a shortest route in the plurality of roadways based on an order of the preferred subset of roadways and the shortest path between each pair of roadways in the subset of roadways, wherein the at least one canonical route comprises roadways in the shortest route in the plurality of roadways.

According to some non-limiting embodiments or aspects, provided is an autonomous vehicle including: one or more sensors for detecting an object in an environment surrounding the autonomous vehicle; a vehicle computing system including one or more processors, wherein the vehicle computing system is to: receive canonical route data associated with at least one canonical route, wherein the at least one canonical route includes at least one roadway connected with another roadway in the plurality of roadways in a geographic location that satisfies at least one route optimization function derived based on trip data associated with one or more traversals of the plurality of roadways in a geographic location by one or more autonomous vehicles; and control travel of the autonomous vehicle based on sensor data from the one or more sensors and the canonical route data associated with the at least one canonical route.

According to some non-limiting embodiments or aspects, provided is an autonomous vehicle including: one or more sensors for detecting an object in an environment surrounding the autonomous vehicle; a vehicle computing system including one or more processors, wherein the vehicle computing system is to: receive trip data associated with one or more traversals of a plurality of roadways in a geographic location by one or more autonomous vehicles; generate at least one canonical route based on the trip data, wherein the at least one canonical route includes at least one roadway connected with another roadway in the plurality of roadways; provide canonical route data associated with the at least one canonical route to an autonomous vehicle for controlling travel of the autonomous vehicle on the at least one canonical route; and control travel of the autonomous vehicle based on sensor data from the one or more sensors and the canonical route data associated with the at least one canonical route.

In some non-limiting embodiments or aspects, the vehicle computing system is further configured to receive the trip data associated with the one or more traversals of the plurality of roadways in the geographic location by the one or more autonomous vehicles; generate the at least one canonical route based on the trip data; provide the canonical route data associated with the at least one canonical route; and control travel of the autonomous vehicle based on sensor data from the one or more sensors and the canonical route data associated with the at least one canonical route.

In some non-limiting embodiments or aspects, the vehicle computing system is further configured to receive map data associated with a map of the geographic location; and determine the plurality of roadways in the geographic location based on the map data and autonomy criteria, wherein the autonomy criteria is associated with an indication of whether the autonomous vehicle can travel on the plurality of roadways.

In some non-limiting embodiments or aspects, the vehicle computing system is further configured to determine a subset of roadways of the plurality of roadways associated with trip data that satisfies a threshold value, wherein each roadway of the subset of roadways must be traversed in a route; determine a shortest path between each pair of roadways of the subset of roadways; determine a shortest route in the subset of roadways that includes each roadway of the subset of roadways; and determine a shortest route in the plurality of roadways based on an order of the subset of roadways in the shortest route of the subset of roadways and the shortest path between each pair of roadways in the subset of roadways, wherein the at least one canonical route comprises roadways in the shortest route in the plurality of roadways.

In some non-limiting embodiments or aspects, the vehicle computing system is further configured to determine a trimmed set of roadways of the plurality of roadways associated with trip data that satisfies a threshold value, wherein each roadway of the trimmed set of roadways must not be traversed in a route; determine a subset of roadways based on the trimmed set of roadways, wherein the subset of roadways comprises a largest strongly connected set of roadways remaining after removing the trimmed set of roadways from the plurality of roadways; determine a shortest path between pairs of roadways in the subset of roadways; determine, for each of a plurality of random subsets of roadways in the subset of roadways, a shortest route that includes each roadway of that random subset of roadways; apply an objective function derived based on the trip data to each of the shortest routes determined for each random subset of the plurality of random subsets of roadways to determine an objective function value for that shortest route; determine a preferred subset of roadways based on the objective function values of the plurality of shortest routes; and determine a shortest route in the plurality of roadways based on an order of the preferred subset of roadways and the shortest path between each pair of roadways in the subset of roadways, wherein the at least one canonical route comprises roadways in the shortest route in the plurality of roadways.

Further non-limiting embodiments or aspects are set forth in the following numbered clauses:

Clause 1: A method for determining a canonical route comprising: receiving, with a computing system comprising one or more processors, trip data associated with one or more traversals of a plurality of roadways in a geographic location by one or more autonomous vehicles; generating, with the computing system, at least one canonical route based on the trip data, wherein the at least one canonical route comprises at least one roadway connected with another roadway in the plurality of roadways; and providing, with the computing system, canonical route data associated with the at least one canonical route to an autonomous vehicle for controlling travel of the autonomous vehicle on the at least one canonical route.

Clause 2: The method of clause 1, further comprising: receiving map data associated with a map of the geographic location; and determining the plurality of roadways in the geographic location based on the map data and autonomy criteria, wherein the autonomy criteria is associated with an indication of whether the autonomous vehicle can travel on the plurality of roadways.

Clause 3: The method of clauses 1 or 2, wherein the trip data comprises at least one of: a number of interventions associated with the one or more traversals of the plurality of roadways in the geographic location by the one or more autonomous vehicles, a number of hazards associated with the one or more traversals of the plurality of roadways in the geographic location by the one or more autonomous vehicles, or any combination thereof.

Clause 4: The method of any of clauses 1-3, wherein generating the at least one canonical route comprises: determining the at least one canonical route based on at least one objective function derived from the trip data.

Clause 5: The method of any of clauses 1-4, wherein generating the at least one canonical route comprises: determining a subset of roadways of the plurality of roadways associated with trip data that satisfies a threshold value, wherein each roadway of the subset of roadways must be traversed in a route; determining a shortest path between each pair of roadways of the subset of roadways; determining a shortest route in the subset of roadways that includes each roadway of the subset of roadways; determining a shortest route in the plurality of roadways based on an order of the subset of roadways in the shortest route of the subset of roadways and the shortest path between each pair of roadways in the subset of roadways; and wherein the at least one canonical route comprises roadways in the shortest route in the plurality of roadways.

Clause 6: The method of any of clauses 1-5, wherein generating the at least one canonical route comprises: determining a trimmed set of roadways of the plurality of roadways associated with trip data that satisfies a threshold value, wherein each roadway of the trimmed set of roadways must not be traversed in a route; determining a subset of roadways based on the trimmed set of roadways, wherein the subset of roadways comprises a largest strongly connected set of roadways remaining after removing the trimmed set of roadways from the plurality of roadways; determining a shortest path between pairs of roadways in the subset of roadways; determining, for each of a plurality of random subsets of roadways in the subset of roadways, a shortest route that includes each roadway of that random subset of roadways; applying an objective function derived based on the trip data to each of the shortest routes determined for each random subset of the plurality of random subsets of roadways to determine an objective function value for that shortest route; determining a preferred subset of roadways based on the objective function values of the plurality of shortest routes; determining a shortest route in the plurality of roadways based on an order of the preferred subset of roadways and the shortest path between each pair of roadways in the subset of roadways; and wherein the at least one canonical route comprises roadways in the shortest route in the plurality of roadways.

Clause 7: The method of any of clauses 1-6, wherein generating the at least one canonical route comprises: determining a subset of roadways of the plurality of roadways based on the trip data and at least one threshold; determining a shortest path between pairs of roadways in the subset of roadways; determining, for each of a plurality of random subsets of roadways in the subset of roadways, a shortest route that includes each roadway of that random subset of roadways; determining, for each of the plurality of random subsets of roadways, a shortest route in the plurality of roadways based on an order of that random subset of roadways in the shortest route and the shortest path between pairs of roadways; applying an objective function derived based on the trip data to each of the shortest routes determined in the plurality of roadways to determine an objective function value for that shortest route; and determining the at least one canonical route based on the objective function values of the shortest routes in the plurality of roadways.

Clause 8: A computing system comprising: one or more processors to: receive trip data associated with one or more traversals of a plurality of roadways in a geographic location by one or more autonomous vehicles; generate at least one canonical route based on the trip data, wherein the at least one canonical route comprises at least one roadway connected with another roadway in the plurality of roadways; and provide canonical route data associated with the at least one canonical route to an autonomous vehicle for controlling travel of the autonomous vehicle on the at least one canonical route.

Clause 9: The computing system of clause 8, wherein the one or more processors are further to: receive map data associated with a map of the geographic location; and determine the plurality of roadways in the geographic location based on the map data and autonomy criteria, wherein the autonomy criteria is associated with an indication of whether the autonomous vehicle can travel on the plurality of roadways.

Clause 10: The computing system of clauses 8 or 9, wherein the trip data comprises at least one of: a number of interventions associated with the one or more traversals of the plurality of roadways in the geographic location by the one or more autonomous vehicles; a number of hazards associated with the one or more traversals of the plurality of roadways in the geographic location by the one or more autonomous vehicles; or any combination thereof.

Clause 11: The computing system of any of clauses 8-10, wherein the one or more processors are further to: determine the at least one canonical route based on at least one objective function derived from the trip data.

Clause 12: The computing system of any of clauses 8-11, wherein the one or more processors are further to: determine a subset of roadways of the plurality of roadways associated with trip data that satisfies a threshold value, wherein each roadway of the subset of roadways must be traversed in a route; determine a shortest path between each pair of roadways of the subset of roadways; determine a shortest route in the subset of roadways that includes each roadway of the subset of roadways; determine a shortest route in the plurality of roadways based on an order of the subset of roadways in the shortest route of the subset of roadways and the shortest path between each pair of roadways in the subset of roadways; and wherein the at least one canonical route comprises roadways in the shortest route in the plurality of roadways.

Clause 13: The computing system of any of clauses 8-12, wherein the one or more processors are further to: determine a trimmed set of roadways of the plurality of roadways associated with trip data that satisfies a threshold value, wherein each roadway of the trimmed set of roadways must not be traversed in a route; determine a subset of roadways based on the trimmed set of roadways, wherein the subset of roadways comprises a largest strongly connected set of roadways remaining after removing the trimmed set of roadways from the plurality of roadways; determine a shortest path between pairs of roadways in the subset of roadways; determine, for each of a plurality of random subsets of roadways in the subset of roadways, a shortest route that includes each roadway of that random subset of roadways to produce a plurality of shortest routes; apply an objective function derived based on the trip data to the shortest route of each random subset of the plurality of random subsets of roadways to determine an objective function value for that shortest route; determine a preferred subset of roadways based on the shortest route of the plurality of shortest routes determined for the plurality of random subsets that best satisfies the objective function; determine a shortest route in the plurality of roadways based on an order of the preferred subset of roadways and the shortest path between each pair of roadways in the subset of roadways; and wherein the at least one canonical route comprises roadways in the shortest route in the plurality of roadways.

Clause 14: The computing system of any of clauses 8-13, wherein the one or more processors are further to: determine a subset of roadways of the plurality of roadways based on the trip data and at least one threshold; determine a shortest path between pairs of roadways in the subset of roadways;

determine, for each of a plurality of random subsets of roadways in the subset of roadways, a shortest route that includes each roadway of that random subset of roadways; determine, for each of the plurality of random subsets of roadways, a shortest route in the plurality of roadways based on an order of that random subset of roadways in the shortest route and the shortest path between pairs of roadways; apply an objective function derived based on the trip data to each of the shortest routes determined in the plurality of roadways to determine an objective function value for that shortest route; and determine the at least one canonical route based on the objective function values of the shortest routes in the plurality of roadways.

Clause 15: An autonomous vehicle comprising: one or more sensors for detecting an object in an environment surrounding the autonomous vehicle; a vehicle computing system comprising one or more processors, wherein the vehicle computing system is to: receive canonical route data associated with at least one canonical route, wherein the at least one canonical route comprises at least one roadway connected with another roadway in a plurality of roadways in a geographic location that satisfies at least one route optimization function derived based on trip data associated with one or more traversals of the plurality of roadways in a geographic location by one or more autonomous vehicles; and control travel of the autonomous vehicle based on sensor data from the one or more sensors and the canonical route data associated with the at least one canonical route.

Clause 16: The autonomous vehicle of clause 15, wherein the trip data comprises at least one of: a number of interventions associated with the one or more traversals of the plurality of roadways in the geographic location by the one or more autonomous vehicles; a number of hazards associated with the one or more traversals of the plurality of roadways in the geographic location by the one or more autonomous vehicles; or any combination thereof.

Clause 17: The autonomous vehicle of clauses 15 or 16, wherein the vehicle computing system is further to: receive the trip data associated with the one or more traversals of the plurality of roadways in the geographic location by the one or more autonomous vehicles; generate the at least one canonical route based on the trip data; provide the canonical route data associated with the at least one canonical route; and control travel of the autonomous vehicle based on sensor data from the one or more sensors and the canonical route data associated with the at least one canonical route.

Clause 18: The autonomous vehicle of any of clauses 15-17, wherein the vehicle computing system is further to: receive map data associated with a map of the geographic location; and determine the plurality of roadways in the geographic location based on the map data and autonomy criteria, wherein the autonomy criteria is associated with an indication of whether the autonomous vehicle can travel on the plurality of roadways.

Clause 19: The autonomous vehicle of any of clauses 15-18, wherein the vehicle computing system is further to: determine a subset of roadways of the plurality of roadways associated with trip data that satisfies a threshold value, wherein each roadway of the subset of roadways must be traversed in a route; determine a shortest path between each pair of roadways of the subset of roadways; determine a shortest route in the subset of roadways that includes each roadway of the subset of roadways; determine a shortest route in the plurality of roadways based on an order of the subset of roadways in the shortest route of the subset of roadways and the shortest path between each pair of roadways in the subset of roadways; and wherein the at least one canonical route comprises roadways in the shortest route in the plurality of roadways.

Clause 20: The autonomous vehicle of any of clauses 15-19, wherein the vehicle computing system is further to: determine a trimmed set of roadways of the plurality of roadways associated with trip data that satisfies a threshold value, wherein each roadway of the trimmed set of roadways must not be traversed in a route; determine a subset of roadways based on the trimmed set of roadways, wherein the subset of roadways comprises a largest strongly connected set of roadways remaining after removing the trimmed set of roadways from the plurality of roadways; determine a shortest path between pairs of roadways in the subset of roadways; determine, for each of a plurality of random subsets of roadways in the subset of roadways, a shortest route that includes each roadway of that random subset of roadways; apply an objective function derived based on the trip data to each of the shortest routes determined for each random subset of the plurality of random subsets of roadways to determine an objective function value for that shortest route; determine a preferred subset of roadways based on the objective function values of the plurality of shortest routes; determine a shortest route in the plurality of roadways based on an order of the preferred subset of roadways and the shortest path between each pair of roadways in the subset of roadways; and wherein the at least one canonical route comprises roadways in the shortest route in the plurality of roadways.

DETAILED DESCRIPTION

The following detailed description of non-limiting embodiments refers to the accompanying drawings. The same reference numbers in different drawings may identify the same or similar elements.

In some non-limiting embodiments, an autonomous vehicle is operated based on data associated with a route (e.g., one or more roadways) upon which the autonomous vehicle travels. For example, the autonomous vehicle travels on the route based on a map that includes manually input designations regarding a direction that the autonomous vehicle is to travel when the autonomous vehicle travels on a roadway of the route.

However, the autonomous vehicle may travel on a route that is not generated based on one or more attributes associated with a roadway of the route. For example the route may not be generated based on data associated with one or more traversals of one or more roadways of the route by one or more autonomous vehicles. In this way, the autonomous vehicle may be operated inefficiently and/or in an ineffective manner.

As disclosed herein, in some non-limiting embodiments, a service system receives trip data associated with one or more traversals of one or more roadways in a geographic location by one or more autonomous vehicles. The service system generates at least one canonical route based on the trip data associated with one or more traversals of one or more roadways by one or more autonomous vehicles. For example, a canonical route may be selected to satisfy current capabilities of the autonomous vehicle fleet. As another example, a canonical route may be selected to optimize certain service parameters (e.g., maximize trip counts, minimize potential interventions, etc.) In this way, the service system generates a route based on data associated with one or more traversals of one or more roadways by one or more autonomous vehicles. Accordingly, the service system enables the autonomous vehicle to be operated in a more efficient and/or effective manner on a canonical route than when the autonomous vehicle is operated on a route that is not generated based on trip data associated with one or more traversals of one or more roadways by one or more autonomous vehicles.

In some non-limiting embodiments, a canonical route includes at least one roadway connected with another roadway in a plurality of roadways. In some non-limiting embodiments, the service system provides canonical route data associated with the canonical route to an autonomous vehicle for controlling travel of the autonomous vehicle on the canonical route.

Figure 1:
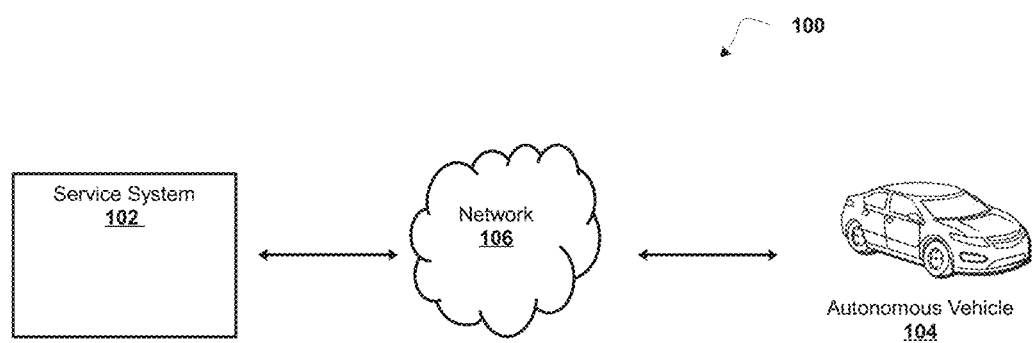
FIG. 1 is a schematic diagram of a non-limiting embodiment or aspect of an environment in which systems and/or methods, described herein, can be implemented.

Referring now to FIG. 1, FIG. 1 is a diagram of a non-limiting embodiment of an environment 100 in which systems and/or methods, described herein, can be implemented. As shown in FIG. 1, environment 100 includes service system 102, autonomous vehicle 104, and network 106. Systems and/or devices of environment 100 can interconnect via wired connections, wireless connections, or a combination of wired and wireless connections.

In some non-limiting embodiments, service system 102 includes one or more devices capable of receiving trip data, processing trip data, generating a canonical route based on the trip data, and/or providing canonical route data associated with the canonical route to autonomous vehicle 104 for controlling travel of autonomous vehicle 104 on the canonical route. For example, service system 102 can include one or more computing systems including one or more processors (e.g., one or more servers, etc.).

In some non-limiting embodiments, autonomous vehicle 104 includes one or more devices capable of receiving canonical route data associated with at least one canonical route and/or controlling travel of autonomous vehicle 104 on the canonical route. In some non-limiting embodiments, autonomous vehicle 104 includes one or more devices capable of receiving trip data, generating at least one canonical route based on the trip data, and/or controlling travel of autonomous vehicle 104 on the canonical route. For example, autonomous vehicle 104 can include one or more computing systems including one or more processors (e.g., one or more servers, etc.). Further details regarding non-limiting embodiments of autonomous vehicle 104 are provided below with regard to FIG. 2.

In some non-limiting embodiments, service system 102 and/or autonomous vehicle 104 include one or more devices capable of receiving, storing, and/or providing map data associated with a map of a geographic location (e.g., a country, a state, a city, a portion of a city, a township, a portion of a township, etc.). For example, maps are used for routing an autonomous vehicle on a roadway specified in the map. In some non-limiting embodiments, map data includes data associated with a road (e.g., an identity and/or a location of a roadway of a road, an identity and/or location of a segment of a road, etc.), data associated with an object in proximity to a road (e.g., a building, a lamppost, a crosswalk, a curb of the road, etc.), data associated with a lane of a roadway (e.g., the location and/or direction of a travel lane, a parking lane, a turning lane, a bicycle lane, etc.), data associated with traffic control of a road (e.g., the location of and/or instructions associated with lane markings, traffic signs, traffic lights, etc.), and/or the like. In some non-limiting embodiments, a map of a geographic location includes one or more routes that include one or more roadways. In some non-limiting embodiments, map data associated with a map of the geographic location associates each roadway of the one or more roadways with an indication of whether autonomous vehicle 104 can travel on that roadway.

In some non-limiting embodiments, a road refers to paved or otherwise improved path between two places that allows for travel by a vehicle (e.g., autonomous vehicle 104). Additionally or alternatively, a road includes a roadway and a sidewalk in proximity to (e.g., adjacent, near, next to, touching, etc.) the roadway. In some non-limiting embodiments, a roadway includes a portion of road on which a vehicle is intended to travel and is not restricted by a physical barrier or by separation so that the vehicle is able to travel laterally. Additionally or alternatively, a roadway includes one or more lanes, such as a travel lane (e.g., a lane upon which a vehicle travels, a traffic lane, etc.), a parking lane (e.g., a lane in which a vehicle parks), a bicycle lane (e.g., a lane in which a bicycle travels), a turning lane (e.g., a lane in which a vehicle turns from), and/or the like. In some non-limiting embodiments, a roadway is connected to another roadway, for example a lane of a roadway is connected to another lane of the roadway and/or a lane of the roadway is connected to a lane of another roadway.

In some non-limiting embodiments, service system 102 and/or autonomous vehicle 104 includes one or more devices capable of receiving, storing, and/or providing trip data associated with one or more traversals of a plurality of roadways (e.g., a plurality of roadways in a geographic location) by one or more autonomous vehicles.

In some non-limiting embodiments, network 106 includes one or more wired and/or wireless networks. For example, network 106 includes a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of systems, devices, and networks shown in FIG. 1 are provided as an example. There can be additional systems, devices and/or networks, fewer systems, devices, and/or networks, different systems, devices and/or networks, or differently arranged systems, devices, and/or networks than those shown in FIG. 1. Furthermore, two or more systems or devices shown in FIG. 1 can be implemented within a single system or a single device, or a single system or a single device shown in FIG. 1 can be implemented as multiple, distributed systems or devices. Additionally, or alternatively, a set of systems or a set of devices (e.g., one or more systems, one or more devices) of environment 100 can perform one or more functions described as being performed by another set of systems or another set of devices of environment 100.

Figure 2:
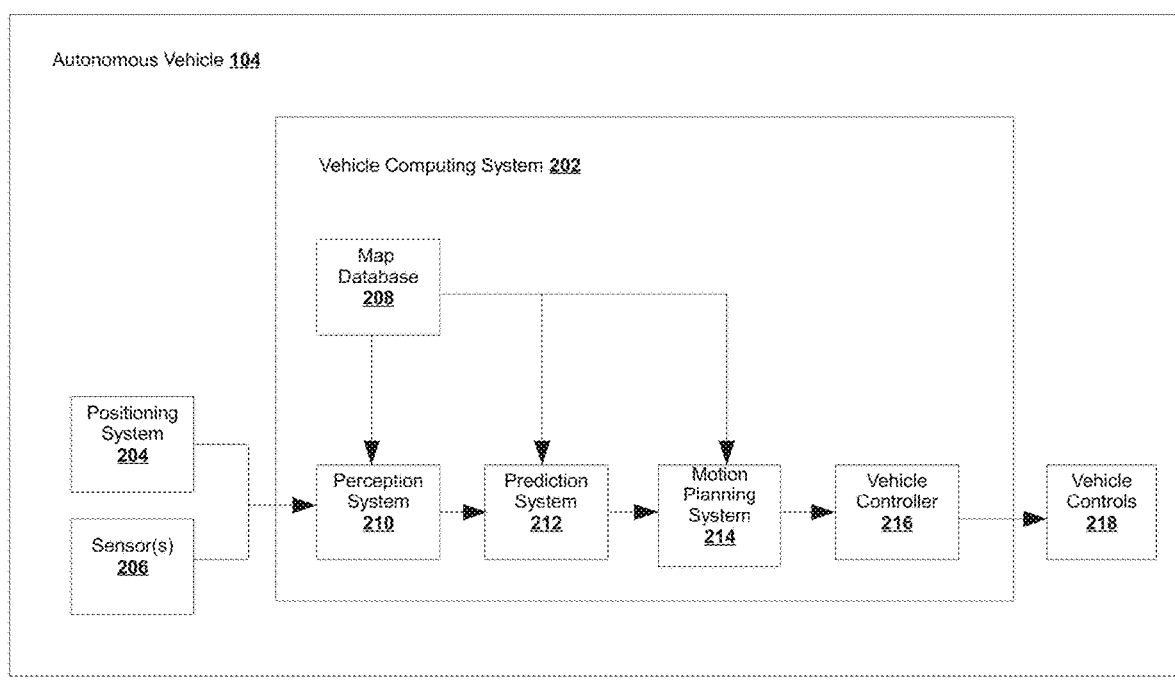
FIG. 2 is a schematic diagram of a non-limiting embodiment or aspect of a system for controlling an autonomous vehicle shown in FIG. 1.

Referring now to FIG. 2, FIG. 2 is a diagram of a non-limiting embodiment of a system 200 for controlling autonomous vehicle 104. As shown in FIG. 2, vehicle computing system 202 includes perception system 210, prediction system 212, and motion planning system 214 that cooperate to perceive a surrounding environment of autonomous vehicle 104 and determine a motion plan for controlling the motion (e.g., the direction of travel) of autonomous vehicle 104 accordingly.

In some non-limiting embodiments, vehicle computing system 202 is connected to or includes positioning system 204. In some non-limiting embodiments, positioning system 204 determines a position (e.g., a current position, a past position, etc.) of autonomous vehicle 104. In some non-limiting embodiments, positioning system 204 determines a position of autonomous vehicle 104 based on an inertial sensor, a satellite positioning system, an IP address (e.g., an IP address of autonomous vehicle 104, an IP address of a device in autonomous vehicle 104, etc.), triangulation based on network components (e.g., network access points, cellular towers, WiFi access points, etc.), and/or proximity to network components, and/or the like. In some non-limiting embodiments, the position of autonomous vehicle 104 is used by vehicle computing system 202.

In some non-limiting embodiments, perception system 210 receives sensor data from one or more sensors 206 that are coupled to or otherwise included in autonomous vehicle 104. For example, one or more sensors 206 includes a Light Detection and Ranging (LIDAR) system, a Radio Detection and Ranging (RADAR) system, one or more cameras (e.g., visible spectrum cameras, infrared cameras, etc.), and/or the like. In some non-limiting embodiments, the sensor data includes data that describes a location of objects within the surrounding environment of the autonomous vehicle 104. In some non-limiting embodiments, one or more sensors 206 collect sensor data that includes data that describes a location (e.g., in three-dimensional space relative to the autonomous vehicle 104) of points that correspond to objects within the surrounding environment of autonomous vehicle 104.

In some non-limiting embodiments, the sensor data includes a location (e.g., a location in three-dimensional space relative to the LIDAR system) of a number of points (e.g., a point cloud) that correspond to objects that have reflected a ranging laser. In some non-limiting embodiments, the LIDAR system measures distances by measuring a Time of Flight (TOF) that a short laser pulse takes to travel from a sensor of the LIDAR system to an object and back, and the LIDAR system calculates the distance of the object to the LIDAR system based on the known speed of light.

In some non-limiting embodiments, the sensor data includes a location (e.g., a location in three-dimensional space relative to the RADAR system) of a number of points that correspond to objects that have reflected a ranging radio wave. In some non-limiting embodiments, radio waves (e.g., pulsed radio waves or continuous radio waves) transmitted by the RADAR system can reflect off an object and return to a receiver of the RADAR system. The RADAR system can then determine information about the object's location and/or speed. In some non-limiting embodiments, the RADAR system provides information about the location and/or the speed of an object relative to the RADAR system based on the radio waves.

In some non-limiting embodiments, image processing techniques (e.g., range imaging techniques such as, for example, structure from motion, structured light, stereo triangulation, etc.) can be performed by system 200 to identify a location (e.g., in three-dimensional space relative to the one or more cameras) of a number of points that correspond to objects that are depicted in images captured by one or more cameras. Other sensors can identify the location of points that correspond to objects as well.

In some non-limiting embodiments, perception system 210 detects and/or tracks objects (e.g., vehicles, pedestrians, bicycles, and the like) that are proximate to (e.g., in proximity to the surrounding environment of) the autonomous vehicle 104 over a time period. In some non-limiting embodiments, perception system 210 can retrieve (e.g., obtain) map data from map database 208 that provides detailed information about the surrounding environment of the autonomous vehicle 104.

In some non-limiting embodiments, perception system 210 determines one or more objects that are proximate to autonomous vehicle 104 based on sensor data received from one or more sensors 206 and/or map data from map database 208. For example, perception system 210 determines, for the one or more objects that are proximate, state data associated with a state of such object. In some non-limiting embodiments, the state data associated with an object includes data associated with a location of the object (e.g., a position, a current position, an estimated position, etc.), data associated with a speed of the object (e.g., a magnitude of velocity of the object), data associated with a direction of travel of the object (e.g., a heading, a current heading, etc.), data associated with an acceleration rate of the object (e.g., an estimated acceleration rate of the object, etc.), data associated with an orientation of the object (e.g., a current orientation, etc.), data associated with a size of the object (e.g., a size of the object as represented by a bounding shape such as a bounding polygon or polyhedron, a footprint of the object, etc.), data associated with a type of the object (e.g., a class of the object, an object with a type of vehicle, an object with a type of pedestrian, an object with a type of bicycle, etc.), and/or the like.

In some implementations, perception system 210 determines state data for an object over a number of iterations of determining state data. For example, perception system 210 updates the state data for each object of a plurality of objects during each iteration.

In some non-limiting embodiments, prediction system 212 receives the state data associated with one or more objects from perception system 210. Prediction system 212 predicts one or more future locations for the one or more objects based on the state data. For example, prediction system 212 predicts the future location of each object of a plurality of objects within a time period (e.g., 5 seconds, 10 seconds, 20 seconds, etc.). In some non-limiting embodiments, prediction system 212 predicts that an object will adhere to the object's direction of travel according to the speed of the object. In some non-limiting embodiments, prediction system 212 uses machine learning techniques or modeling techniques to make a prediction based on state data associated with an object.

In some non-limiting embodiments, motion planning system 214 determines a motion plan for autonomous vehicle 104 based on a prediction of a location associated with an object provided by prediction system 212 and/or based on state data associated with the object provided by perception system 210. For example, motion planning system 214 determines a motion plan (e.g., an optimized motion plan) for the autonomous vehicle 104 that causes autonomous vehicle 104 to travel relative to the object based on the prediction of the location for the object provided by prediction system 212 and/or the state data associated with the object provided by perception system 210.

In some non-limiting embodiments, motion planning system 214 determines a cost function for each of one or more motion plans for autonomous vehicle 104 based on the locations and/or predicted locations of one or more objects. For example, motion planning system 214 determines the cost function that describes a cost (e.g., a cost over a time period) of following (e.g., adhering to) a motion plan (e.g., a selected motion plan, an optimized motion plan, etc.). In some non-limiting embodiments, the cost associated with the cost function increases and/or decreases based on autonomous vehicle 104 deviating from a motion plan (e.g., a selected motion plan, an optimized motion plan, a preferred motion plan, etc.). For example, the cost associated with the cost function increases and/or decreases based on autonomous vehicle 104 deviating from the motion plan to avoid a collision with an object.

In some non-limiting embodiments, motion planning system 214 determines a cost of following a motion plan. For example, motion planning system 214 determines a motion plan for autonomous vehicle 104 based on one or more cost functions. In some non-limiting embodiments, motion planning system 214 determines a motion plan (e.g., a selected motion plan, an optimized motion plan, a preferred motion plan, etc.) that minimizes a cost function. In some non-limiting embodiments, motion planning system 214 provides a motion plan to vehicle controller 216 and vehicle controller 216 controls one or more vehicle controls 218 (e.g., a device that controls acceleration, a device that controls steering, a device that controls braking, an actuator that controls gas flow, etc.) to implement the motion plan.

Figure 3:
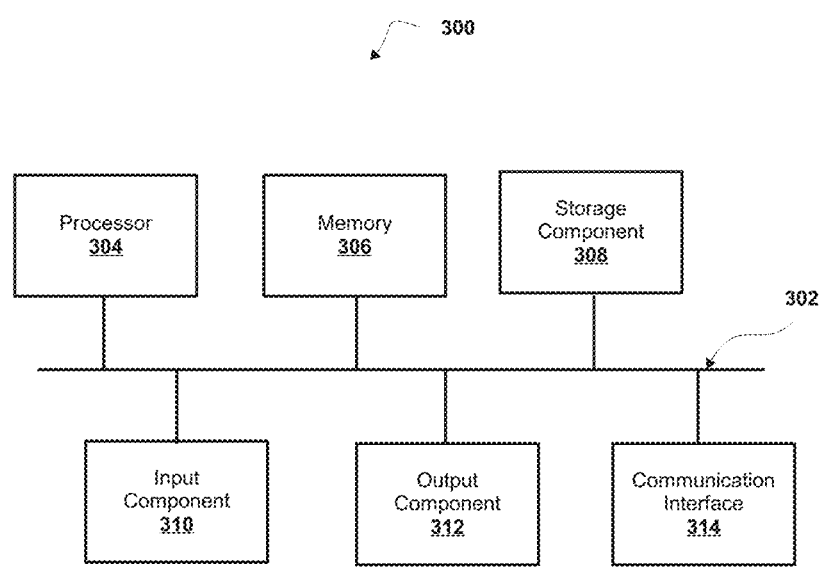
FIG. 3 is a schematic diagram of a non-limiting embodiment or aspect of components of one or more devices of FIGS. 1 and 2.

Referring now to FIG. 3, FIG. 3 is a diagram of example components of a device 300. Device 300 can correspond to one or more devices of service system 102 and/or one or more devices (e.g., one or more devices of a system of) autonomous vehicle 104. In some non-limiting embodiments, one or more devices of service system 102 and/or one or more devices (e.g., one or more devices of a system of) autonomous vehicle 104 can include at least one device 300 and/or at least one component of device 300. As shown in FIG. 3, device 300 includes bus 302, processor 304, memory 306, storage component 308, input component 310, output component 312, and communication interface 314.

Bus 302 includes a component that permits communication among the components of device 300. In some non-limiting embodiments, processor 304 is implemented in hardware, firmware, or a combination of hardware and software. For example, processor 304 includes a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 306 includes a random access memory (RAM), a read only memory (ROM), and/or another type of dynamic or static storage device (e.g., flash memory, magnetic memory, optical memory, etc.) that stores information and/or or instructions for use by processor 304.

Storage component 308 stores information and/or software related to the operation and use of device 300. For example, storage component 308 includes a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 310 includes a component that permits device 300 to receive information, such as via user input (e.g., a touch screen display, a keyboard, a keypad, a mouse, a button, a switch, a microphone, etc.). Additionally, or alternatively, input component 310 includes a sensor for sensing information (e.g., a global positioning system (GPS) component, an accelerometer, a gyroscope, an actuator, etc.). Output component 312 includes a component that provides output information from device 300 (e.g., a display, a speaker, one or more light-emitting diodes (LEDs), etc.).

Communication interface 314 includes a transceiver-like component (e.g., a transceiver, a separate receiver and transmitter, etc.) that enables device 300 to communicate with other devices, such as via a wired connection, a wireless connection, or a combination of wired and wireless connections. Communication interface 314 can permit device 300 to receive information from another device and/or provide information to another device. For example, communication interface 314 includes an Ethernet interface, an optical interface, a coaxial interface, an infrared interface, a radio frequency (RF) interface, a universal serial bus (USB) interface, a Wi-Fi interface, a cellular network interface, and/or the like.

Device 300 can perform one or more processes described herein. Device 300 can perform these processes based on processor 304 executing software instructions stored by a computer-readable medium, such as memory 306 and/or storage component 308. A computer-readable medium (e.g., a non-transitory computer-readable medium) is defined herein as a non-transitory memory device. A memory device includes memory space located inside of a single physical storage device or memory space spread across multiple physical storage devices.

Software instructions can be read into memory 306 and/or storage component 308 from another computer-readable medium or from another device via communication interface 314. When executed, software instructions stored in memory 306 and/or storage component 308 cause processor 304 to perform one or more processes described herein. Additionally, or alternatively, hardwired circuitry can be used in place of or in combination with software instructions to perform one or more processes described herein. Thus, embodiments described herein are not limited to any specific combination of hardware circuitry and software.

The number and arrangement of components shown in FIG. 3 are provided as an example. In some non-limiting embodiments, device 300 includes additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
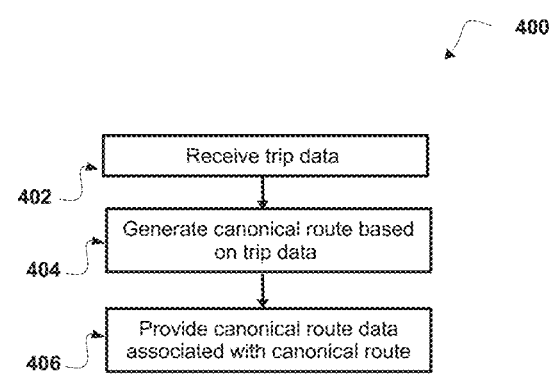
FIG. 4 is a flowchart of a non-limiting embodiment or aspect of a process for determining a canonical route.

Referring now to FIG. 4, FIG. 4 is a flowchart of a non-limiting embodiment of a process 400 for determining a canonical route. In some non-limiting embodiments, one or more of the steps of process 400 are performed (e.g., completely, partially, etc.) by service system 102 (e.g., one or more devices of service system 102). In some non-limiting embodiments, one or more of the steps of process 400 are performed (e.g., completely, partially, etc.) by another device or a group of devices separate from or including service system 102, such autonomous vehicle 104 (e.g., one or more devices of autonomous vehicle 104).

As shown in FIG. 4, at step 402, process 400 includes receiving trip data associated with one or more traversals of a plurality of roadways in a geographic location by one or more autonomous vehicles. For example, service system 102 receives trip data associated with one or more traversals of a plurality of roadways in a geographic location by one or more autonomous vehicles from a database (e.g., a database associated with service system 102, a database located in service system 102, a database remote from service system 102, etc.). In some non-limiting embodiments, a roadway is associated with trip data that defines one or more attributes of (e.g., metadata associated with) the roadway. In some non-limiting embodiments, service system 102 determines the trip data based on one or more traversals of the roadway by one or more autonomous vehicles. For example, service system 102 receives sensor data collected by, received by, and/or determined by one or more sensors (e.g., sensors 206) on the one or more autonomous vehicles during the one or more traversals of the roadway. Service system 102 determines the one or more attributes of the roadway based on the sensor data and service system 102 determines the trip data associated with the roadway based on the one or more attributes of the roadway. In some non-limiting embodiments, service system 102 determines the trip data associated with the roadway based on map data associated with the roadway.

In some non-limiting embodiments, the trip data is associated with one or more attributes of a roadway (e.g., attributes of a roadway in a geographic location, attributes of a lane of a roadway, etc.), such as one or more features of the roadway associated with one or more traversals of the roadway by one or more autonomous vehicles, a number of traversals of the roadway by one or more autonomous vehicles, a number of interventions associated with one or more traversals of the roadway by one or more autonomous vehicles, a number of objects (e.g., a number of hazards, a number of bicycles, a railway track in proximity to the roadway, etc.) associated with one or more traversals of the roadway by one or more autonomous vehicles, a distance (e.g., an average distance, a mile, etc.) associated with one or more traversals of the roadway by one or more autonomous vehicles (e.g., a distance until a detection of a hazardous event, a distance until detection of a potentially harmful or a harmful event to an autonomous vehicle, to a rider of the autonomous vehicle, to a pedestrian, a distance between a first detection of a hazardous event and a second detection of a hazardous event, miles per harmful event, etc.), one or more traffic controls of the roadway associated with one or more traversals of the roadway by one or more autonomous vehicles, one or more aspects of the roadway (e.g., a dimension of one or more lanes of the roadway, a width of one or more lanes of the roadway, a number of bicycle lanes of the roadway, etc.) associated with one or more traversals of the roadway by one or more autonomous vehicles, a speed of one or more autonomous vehicles associated with one or more traversals of the roadway by the one or more autonomous vehicles, and/or the like.

In some non-limiting embodiments, a feature of a roadway includes a road edge of a road (e.g., a location of a road edge of a road, a distance of location from a road edge of a road, an indication whether a location is within a road edge of a road, etc.), an intersection of a road with another road, a roadway of a road, a lane of a roadway of a road (e.g., a travel lane of a roadway, a parking lane of a roadway, a turning lane of a roadway, lane markings, a direction of travel in a lane of a roadway, etc.), one or more objects (e.g., a vehicle, vegetation, a pedestrian, a structure, a building, a sign, a lamppost, signage, a traffic sign, a bicycle, a railway track, a hazardous object, etc.) in proximity to and/or within a road (e.g., objects in proximity to the road edges of a road and/or within the road edges of a road), a sidewalk of a road, and/or the like.

As further shown in FIG. 4, at step 404, process 400 includes generating a canonical route based on the trip data. For example, service system 102 generates a canonical route based on the trip data. In some non-limiting embodiments, the canonical route comprises a roadway of a plurality of roadways is connected with another roadway of the plurality of roadways, for example, a lane of a roadway is connected to another lane of the roadway and/or a lane of the roadway is connected to a lane of another roadway.

In some non-limiting embodiments, service system 102 generates the canonical route based on the one or more attributes of a roadway (e.g., attributes of a roadway in a geographic location, attributes of a lane of a roadway, etc.), such as one or more features of the roadway associated with one or more traversals of the roadway by one or more autonomous vehicles, a number of traversals of the roadway by one or more autonomous vehicles, a number of interventions associated with one or more traversals of the roadway by one or more autonomous vehicles, a number of objects (e.g., a number of hazards, a number of bicycles, a railway track in proximity to the roadway, etc.) associated with one or more traversals of the roadway by one or more autonomous vehicles, a distance (e.g., an average distance, a mile, etc.) associated with one or more traversals of the roadway by one or more autonomous vehicles (e.g., a distance until a detection of a hazardous event, a distance until detection of a potentially harmful or a harmful event to an autonomous vehicle, to a rider of the autonomous vehicle, to a pedestrian, a distance between a first detection of a hazardous event and a second detection of a hazardous event, miles per harmful event, etc.), one or more traffic controls of the roadway associated with one or more traversals of the roadway by one or more autonomous vehicles, one or more aspects of the roadway (e.g., a dimension of one or more lanes of the roadway, a width of one or more lanes of the roadway, a number of bicycle lanes of the roadway, etc.) associated with one or more traversals of the roadway by one or more autonomous vehicles, a speed of one or more autonomous vehicles associated with one or more traversals of the roadway by the one or more autonomous vehicles, and/or the like.

Further details regarding step 404 of process 400 are provided below with regard to FIG. 5.

As further shown in FIG. 4, at step 406, process 400 includes providing canonical route data associated with the canonical route to an autonomous vehicle. For example, service system 102 provides (e.g., transmits) canonical route data associated with the canonical route to autonomous vehicle 104. In some non-limiting embodiments, service system 102 and/or autonomous vehicle 104 controls travel of autonomous vehicle 104 based on the canonical route. For example, vehicle controller 216 controls one or more vehicle controls 218 of autonomous vehicle 104 based on canonical route data associated with the canonical route.

Figure 5:
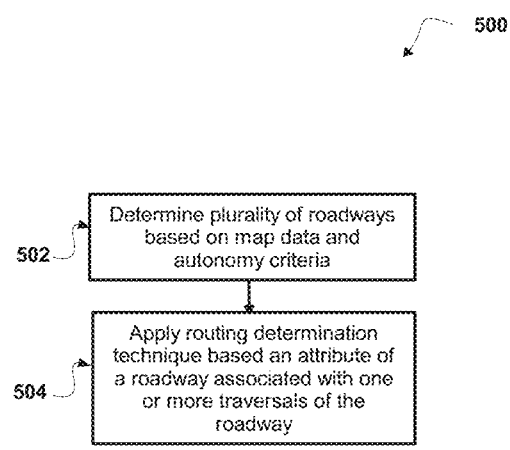
FIG. 5 is a flowchart of a non-limiting embodiment or aspect of a process for determining a canonical route.

Referring now to FIG. 5, FIG. 5 is a flowchart of a non-limiting embodiment of a process 500 for determining a canonical route. In some non-limiting embodiments, one or more of the steps of process 500 are performed (e.g., completely, partially, etc.) by service system 102 (e.g., one or more devices of service system 102). In some non-limiting embodiments, one or more of the steps of process 500 are performed (e.g., completely, partially, etc.) by another device or a group of devices separate from or including service system 102, such as autonomous vehicle 104 (e.g., one or more devices of autonomous vehicle 104).

As shown in FIG. 5, at step 502, process 500 includes determining a plurality of roadways based on map data and/or autonomy criteria. For example, service system 102 determines a plurality of roadways based on map data and/or autonomy criteria. In some non-limiting embodiments, service system 102 determines the plurality of roadways in a geographic location based on the map data and/or autonomy criteria. In some non-limiting embodiments, autonomy criteria is associated with an indication of whether the autonomous vehicle can travel on the plurality of roadways. For example, autonomy criteria is associated with an indication of whether autonomous vehicle 104 can travel on a route or a roadway. In some non-limiting embodiments, the indication of whether autonomous vehicle 104 can travel on a route or a roadway is based on whether a traversal of the route or the roadway requires an autonomous vehicle to perform one or more prohibited actions, such as a U-turn on the route or the roadway, crossing a railway track on the route or the roadway, performing an unprotected turn on the route or the roadway, performing a turn that includes crossing a bicycle lane on the route or the roadway, and/or the like.

In some non-limiting embodiments, service system 102 receives map data associated with a map of a geographic location. For example, service system 102 receives map data associated with a map of the geographic location from a database (e.g., a database associated with service system 102, a database located in service system 102, a database remote from service system 102, etc.).

As further shown in FIG. 5, at step 504, process 500 includes applying a routing determination technique based on an attribute of a roadway associated with one or more traversals of the roadway by one or more autonomous vehicles. For example, service system 102 applies a routing determination technique based on an attribute of a roadway associated with one or more traversals of the roadway by one or more autonomous vehicles.

In some non-limiting embodiments, service system 102 determines a canonical route based on an objective function derived from the trip data. For example, service system 102 determines the canonical route based on an objective function derived from the trip data based on receiving the trip data.

In some non-limiting embodiments, the objective function optimizes (e.g., maximizes, minimizes, etc.) an attribute of a roadway for a canonical route. For example, the objective function can be optimized to maximize a value associated with miles per harmful event. In some non-limiting embodiments, service system 102 optimizes the objective function based on the following equation:

$$\max \frac{\sum_{i \in L} d_i x_i}{\sum_{i \in L} h_i x_i} \quad (1)$$

In equation (1), L represents a set of all lanes in a map of a geographical location, $h_i$ and $d_i$ represent a first attribute (e.g., a number of harmful events) and a second attribute (e.g., a distance traversed) associated with lane $i \in L$. $x_i \in \{0, 1\}$ is a binary variable indicating whether lane i is selected in a final route (e.g., a canonical route). For example, such an objective function may be non-additive, and an inequality of the objective function is defined according to the following equation:

$$\min\left\{\frac{d_1}{h_1}, \frac{d_2}{h_2}\right\} \le \frac{d_1 + d_2}{h_1 + h_2} \le \max\left\{\frac{d_1}{h_1}, \frac{d_2}{h_2}\right\} \quad (2)$$

In some non-limiting embodiments, service system 102 linearizes the objective function according to the following equation:

$$y_i = \frac{x_i}{\sum_{i \in L} h_i x_i} \quad (3)$$

and equation (1) is rewritten as the following equation:

$$\max \sum_{i \in L} d_i y_i \quad (4)$$

and equation (4) is rewritten, based on a transformation, as the following equation:

$$\sum_{i \in L} h_i y_i = 1 \quad (5)$$

In equation (1) the original nonlinear optimization problem is transformed into a linear optimization problem with an additional constraint. In some non-limiting embodiments, service system 102 applies a greedy algorithm to solve equation (5). For example, service system 102 uses a greedy algorithm to select lanes with a high $d_i/h_i$ ratio. In such an example, service system 102 uses the greedy algorithm to solve the following equation (e.g., an additive objective function):

$$\max \sum_{i \in L} \frac{d_i}{h_i} x_i \quad (6)$$

In some non-limiting embodiments, service system 102 determines the canonical route based on the lanes selected according to equation (6). For example, service system 102 determines that the canonical route includes the lanes selected according to equation (6).

In some non-limiting embodiments, service system 102 determines a canonical route based on nonlinear integer programming with binary decision values derived from the trip data. For example, service system 102 determines the canonical route based on nonlinear integer programming with binary decision values derived from the trip data based on receiving the trip data.

In some non-limiting embodiments, service system 102 determines a canonical route based on nonlinear integer programming by defining a graph (e.g., a lane graph) G=(V, E), where V is a collection of nodes (e.g., lanes), and E is a collection of edges (e.g., connections between the lanes, road edges, etc.). In some non-limiting embodiments, the collection of nodes (e.g., lanes), and/or the collection of edges (e.g., connections between the lanes, road edges, etc.) are stored in a database (e.g., a graph database). In some non-limiting embodiments, data are carried on edges of the graphs and $d^k_{ij}$ is used to denote the k-th type of data associated with lane $(i, j) \in E$. Additionally, $x_{ij} \in \{0, 1\}$, $\forall(i, j) \in E$ are binary decision variables, indicating whether edge $(i, j)$ should be included in a generated route (e.g., a canonical route). In some non-limiting embodiments, service system 102 provides an objective function that takes all decision variables $x_{ij}$ and data $d^k_{ij}$ and outputs a real number according to the following equation:

$$f(x, d^1, d^2, \ldots, d^K) \tag{7}$$

In some non-limiting embodiments, service system 102 adds a constraint to the canonical route based on the following equation:

$$\sum_{j:(i,j) \in E} x_{ij} = \sum_{j:(j,i) \in E} x_{ji}, \ \forall \, i \in V \tag{8}$$

For example, if an edge enters a node, the same node has an exit edge. Similarly, if no edge enters a node, the node does not have edges exiting the node.

In some non-limiting embodiments, service system 102 adds a constraint that each node can be visited no more than once in a canonical route based on the following equation:

$$\sum_{j:(i,j) \in E} x_{ij} \leq 1, \ \forall \, i \in V \tag{9}$$

Based on the constraints according to equations (8) and (9), x=0 is a feasible solution, for example, when minimizing some metrics or attributes for a route (e.g., a canonical route). In some non-limiting embodiments, service system 102 adds a constraint on the total length of the canonical route according to the following equation:

$$\sum_{e \in E} x_e \geq M \tag{10}$$

In some non-limiting embodiments, service system 102 generates the canonical route with a length of at least M according to equation (7) with respect to the constraints according to equations (8), (9), and/or (10). In some non-limiting embodiments, service system 102 adds more constraints on various metrics or attributes to the canonical route based on the following equation:

$$g_i(x, d^1, d^2, \ldots, d^K) \geq (\leq) M_i \tag{11}$$

In some non-limiting embodiments, service system 102 uses a Miller-Tucker-Zemlin (MTZ) formulation to remove subtours (e.g., substrips, traversals, smaller tours or loops in a generated route as opposed to a single larger route, etc.), which may use additional auxiliary variables and constraints and select a particular depot before optimization. For example, if the selected depot is v, and n=|V|, service system 102 adds an auxiliary variable u for each node in the graph, where the MTZ constraints of the MTZ formulation are defined according to the following equations:

$$u_v = 1 \tag{12}$$

$$2 \leq u_i \leq n, \ \forall i \in V \setminus \{v\} \tag{13}$$

$$u_i - u_j + 1 \leq (n-1)(1 - x_{ij}), \forall i, j \in V \setminus \{v\} \text{ and } (i, j) \in E \tag{14}$$

For example, a subtour included in a generated route that does not traverse the depot v violates the set of constraints defined according to equations (12), (13), and/or (14), and the service system 102 can remove the subtour from the generated route based on the violation.

In some non-limiting embodiments, service system 102 determines a canonical route to optimize a number of trips (e.g., trips of a route, trips that include traveling a route, etc.) covered by the canonical route. For example, service system 102 determines the canonical route to optimize a number of trips based on receiving the trip data.

In some non-limiting embodiments, service system 102 determines whether a route x can cover a trip $T_i$ according to the following equation:

$$\mathbb{I}\{T_i \subseteq aug(x)\} \tag{15}$$

In equation (15), $T_i = \{l_1^i, l_2^i, \ldots, l_{k_i}^i\}$ represents a set of lanes that a vehicle traverses when traveling on trip $T_i$. Function aug(•) represents a result of augmenting a final route (e.g., a canonical route), e.g., expanding pick-up and drop-off locations to a first predetermined area, e.g., a 100-meter radius circle, and using lanes within a second predetermined area, e.g., a 500-meter radius circle, during a traversal of the final route.

In some non-limiting embodiments, service system 102 performs an optimization on a linear combination of the number of trips covered and the function aug(•) based on an objective function according to the following equation (16):

$$\alpha \sum_i \mathbb{I}\{T_i \subseteq aug(x)\} + \beta f(x, d^1, d^2, \ldots, d^K) \tag{16}$$

In some non-limiting embodiments, service system 102 determines a canonical route to optimize a number of trips covered by the canonical route according to equations (15) and (16).

In some non-limiting embodiments, service system 102 determines a canonical route based on the trip data according to growing algorithm or growing technique. For example, service system 102 determines the canonical route based on the trip data according to growing algorithm or growing technique based on receiving the trip data.

In some non-limiting embodiments, service system 102 determines a subset of roadways of the plurality of roadways (e.g., a subset of lanes of a plurality of lanes of a plurality of roadways, etc.) associated with trip data that satisfies a threshold value. As an example, service system 102 determines the subset of roadways as including roadways of the plurality of roadways that are associated with attributes above a threshold value (e.g., a distance traveled per intervention above a threshold distance per intervention). In some non-limiting embodiments, one or more roadways (e.g., each roadway) of the subset of roadways must be traversed in a route (e.g., a canonical route).

In some non-limiting embodiments, service system 102 determines a shortest path (e.g., a shortest distance, a shortest route, etc.) between each pair of roadways of the subset of roadways. For example, service system 102 applies a shortest path algorithm (e.g., Dijkstra's algorithm) to the subset of roadways to determine the shortest path between each pair of roadways of the subset of roadways. In some non-limiting embodiments, roadway and/or lane changes are penalized in determining a length of roadways or lanes.

In some non-limiting embodiments, service system 102 determines a shortest route in the subset of roadways that includes each roadway of the subset of roadways. For example, service system 102 solves the traveling salesman problem (TSP) for the subset of roadway (e.g., using a heuristic algorithm).

In some non-limiting embodiments, service system 102 determines a shortest route in the plurality of roadways based on an order of the subset of roadways in the shortest route of the subset of roadways and the shortest path between each pair of roadways in the subset of roadways. As an example, service system 102 connects roadways (e.g., lanes of roadways) in the plurality of roadways according to the order of roadways in the subset of roadways in the shortest route of the subset of roadways, and service system 102 determines connections and/or roadways between the connected roadways in the plurality of roadways according to the shortest paths between each pair of roadways of the subset of roadways. For example, the shortest path in the subset of roadways is mapped to the plurality of roadways to determine the shortest route in the plurality of roadways. In some non-limiting embodiments, service system 102 generates a canonical route that includes roadways (e.g., lanes of roadways) in the shortest route in the plurality of roadways.

In some non-limiting embodiments, service system 102 determines a canonical route based on trip data according to a trimming algorithm or trimming technique. For example, service system 102 determines the canonical route based on trip data according to a trimming algorithm or trimming technique based on receiving the trip data.

In some non-limiting embodiments, service system 102 determines a set of roadways (e.g., a trimmed set of roadways, a set of lanes of a set of roadways, a trimmed set of lanes of a trimmed set of roadways, etc.) of a plurality of roadways associated with trip data that satisfies a threshold value of an attribute of a roadway. As an example, service system 102 determines the trimmed subset of roadways as including roadways of the plurality of roadways that are associated with attributes above a threshold value (e.g., a number of interventions per a distance traveled above a threshold value of a number of interventions per a distance traveled). In some non-limiting embodiments, service system 102 determines that one or more (e.g., each) roadway of the trimmed set of roadways must not be traversed in a route (e.g., a canonical route).

In some non-limiting embodiments, service system 102 determines a subset (e.g., a subset of a set) of roadways based on the trimmed set of roadways, where the subset of roadways comprises a largest strongly connected set of roadways remaining after removing the trimmed set of roadways from the plurality of roadways. For example, service system 102 removes roadways of the trimmed set of roadways from the plurality of roadways and determines the largest strongly connected set of roadways (e.g., the set of roadways with the highest number of roadways that are strongly connected) remaining after removing the trimmed set of roadways from the plurality of roadways by applying Tarjan's algorithm or Tarjan's technique to the remainder of the plurality of roadways after the trimmed set of roadways are removed from the plurality of roadways.

In some non-limiting embodiments, service system 102 determines a shortest path between pairs of roadways in the subset of roadways. For example, service system 102 applies a shortest path algorithm (e.g., Dijkstra's algorithm) to the subset of roadways to determine the shortest path between pairs of roadways of the subset of roadways.

In some non-limiting embodiments, service system 102 determines, for each of a plurality of random subsets of roadways in the subset of roadways, a shortest route that includes each roadway of that random subset of roadways. For example, service system 102 solves the TSP for each random subset of roadways of the plurality of random subsets of roadways (e.g., using a heuristic algorithm).

In some non-limiting embodiments, service system 102 applies an objective function derived based on the trip data to each of the shortest routes determined for each random subset of the plurality of random subsets of roadways to determine an objective function value for that shortest route. For example, the service system 102 determines the objective function value based on optimizing (e.g., maximizing, minimizing, etc.) an attribute of roadways of the shortest routes determined for each random subset of the plurality of random subsets.

In some non-limiting embodiments, service system 102 determines a preferred subset of roadways based on the objective function values of the plurality of shortest routes of the plurality of random subsets of roadways. For example, service system 102 determines roadways of a shortest route (e.g., one or more shortest routes, each shortest route, etc.) of the plurality of shortest routes associated with an objective function value that satisfies the objective function (e.g., satisfies based on a threshold value of the objective function, satisfies based on a maximum threshold value of the objective function, etc.) for the roadways of the preferred subset of roadways.

In some non-limiting embodiments, service system 102 determines a shortest route in the plurality of roadways based on an order of the preferred subset of roadways and the shortest path between pairs of roadways in the subset of roadways. As an example, service system 102 connects roadways (e.g., lanes of roadways) in the plurality of roadways according to the order of roadways in the preferred subset of roadways, and service system 102 determines connections and/or roadways between the connected roadways in the plurality of roadways according to the shortest path between pairs of roadways of the subset of roadways. For example, the shortest route in the preferred subset of roadways is mapped to the plurality of roadways to determine the shortest route in the plurality of roadways. In some non-limiting embodiments, service system 102 generates a canonical route that includes roadways (e.g., lanes of roadways) in the shortest route in the plurality of roadways.

In some non-limiting embodiments, service system 102 determines a canonical route based on the trip data according to a trimming algorithm or trimming technique randomized for objective functions and/or a growing algorithm or growing technique randomized for objective functions. For example, service system 102 determines the canonical route based on the trip data according to a trimming algorithm or trimming technique randomized for objective functions or a growing algorithm or growing technique randomized for objective functions based on receiving the trip data.

In some non-limiting embodiments, service system 102 determines a subset of roadways of the plurality of roadways based on the trip data and at least one threshold value of trip data (e.g., one or more attributes of the trip data associated with an objective function). As an example, the service system 102 grows or trims the plurality of roadways, (e.g., a strongly connected graph of roadways) based on trip data associated with an objective function. For example, the service system 102 removes roadways from the plurality of roadways associated with unfavored attributes (e.g., attributes that satisfy a threshold value of a trimming attribute) with respect to optimizing the objective function to determine the subset of roadways, or the service system 102 grows the subset of roadways by adding roadways of the plurality of roadways associated with favored attributes (e.g., attributes that satisfy a threshold value of a growing attribute).

In some non-limiting embodiments, service system 102 determines a shortest path between pairs of roadways in the subset of roadways. For example, service system 102 applies a shortest path algorithm (e.g., Dijkstra's algorithm) to the subset of roadways to determine the shortest path between pairs of roadways of the subset of roadways.

In some non-limiting embodiments, service system 102 determines, for each of a plurality of random subsets of roadways in the subset of roadways, a shortest route that includes each roadway of that random subset of roadways. For example, service system 102 solves the TSP for each random subset of roadways of the plurality of random subsets of roadways (e.g., using a heuristic algorithm).

In some non-limiting embodiments, service system 102 determines, for each of the plurality of random subsets of roadways, a shortest route in the plurality of roadways based on an order of that random subset of roadways in the shortest route and the shortest path between pairs of roadways. As an example, service system 102 connects roadways (e.g., lanes of roadways) in the plurality of roadways according to the order of roadways in a random subset of roadways. Service system 102 determines connections and/or roadways between the connected roadways in the plurality of roadways according to the shortest paths between pairs of roadways of the subset of roadways. For example, each random subset of roadways is mapped to the plurality of roadways to determine a corresponding shortest route in the plurality of roadways.

In some non-limiting embodiments, service system 102 applies an objective function derived based on the trip data to each of the shortest routes determined in the plurality of roadways to determine an objective function value (e.g., a maximum objective function value, a minimum objective function value, etc.) for that shortest route. For example, the service system 102 determines the objective function value based on optimizing (e.g., maximizing, minimizing, etc.) an attribute of roadways in each of the shortest routes determined in the plurality of roadways.

In some non-limiting embodiments, service system 102 determines the canonical route based on the objective function values of the shortest routes in the plurality of roadways. For example, service system 102 determines roadways of a shortest route in the plurality of roadways associated with an objective function value that satisfies the objective function (e.g., satisfies based on a threshold value of the objective function, satisfies based on a maximum threshold value of the objective function, etc.) for the roadways of the canonical route.

In some non-limiting embodiments, service system 102 determines penalty actions that are penalized in determining lengths of roadways or lanes when determining a canonical route. As an example, service system 102 increases a value (e.g., a value of distance, a value of time of travel, etc.) of a shortest path between a pair of roadways and/or lanes associated with a penalty action when determining a canonical route. For example, in addition to determining the distance between pairs of roadways and/or lanes to determine the shortest path between pairs of roadways and/or lanes, service system 102 determines the shortest path between pairs of roadways and/or lanes by penalizing paths over pairs of roadways and/or lanes associated with trip data. In some non-limiting embodiments, the trip data indicates that a traversal of the pair of roadways and/or lanes requires an autonomous vehicle to perform one or more penalty actions, such as a lane change and/or a turn (e.g., a U-turn, a left turn, a right turn, etc.).

Referring now to FIGS. 6A-6D, FIGS. 6A-6D are diagrams of an overview of a non-limiting embodiment of an implementation 600 relating to a process for determining a canonical route. As shown in FIGS. 6A-6D, implementation 600 may include service system 602 and autonomous vehicle 604. In some non-limiting embodiments, service system 602 may be the same or similar to service system 102. In some non-limiting embodiments, autonomous vehicle 604 may be the same or similar to autonomous vehicle 104.

Figure 6A:
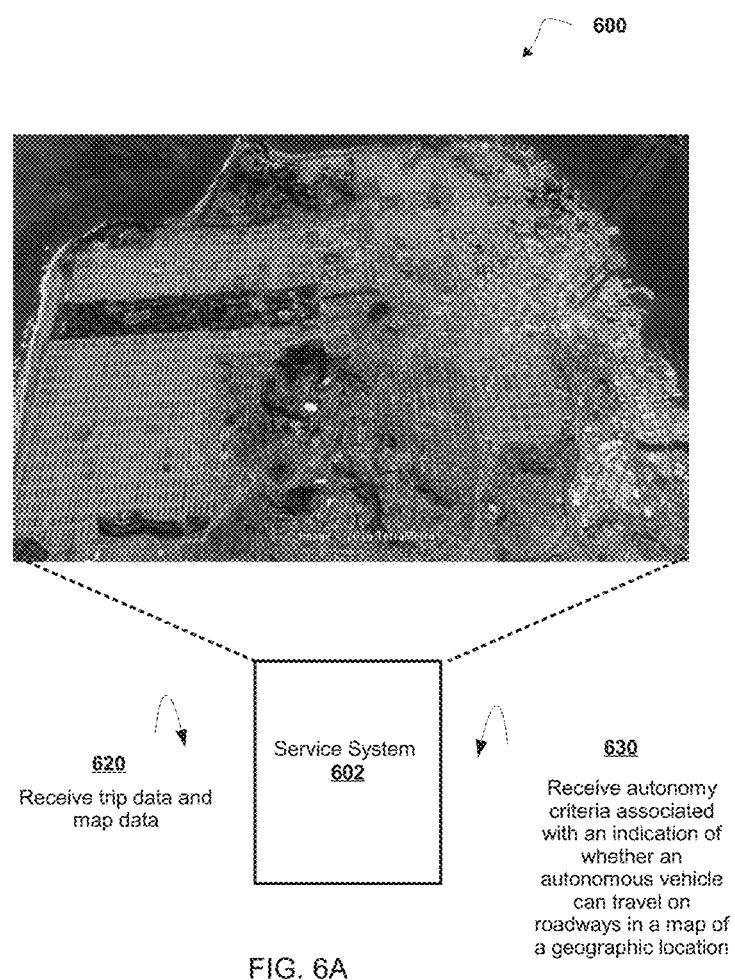
FIGS. 6A-6D are diagrams of an implementation of a non-limiting embodiment or aspect of a process disclosed herein.

As shown by reference number 620 in FIG. 6A, service system 602 receives trip data and map data. For example, service system 602 can retrieve (e.g., obtain) the trip data and/or the map data from one or more databases. In some non-limiting embodiments, the trip data is associated with one or more traversals of a plurality of roadways in a geographic location by one or more autonomous vehicles. In some non-limiting embodiments, the map data is associated with a map of the geographic location.

As shown by reference number 630 in FIG. 6A, service system 602 receives autonomy criteria associated with an indication of whether the autonomous vehicle can travel on the plurality of roadways in a geographic location. In some non-limiting embodiments, the map data includes the autonomy criteria. In some non-limiting embodiments, service system 602 receives the autonomy criteria from a user and/or retrieves (e.g., obtains) the autonomy criteria (e.g., from one or more databases).

Figure 6B:
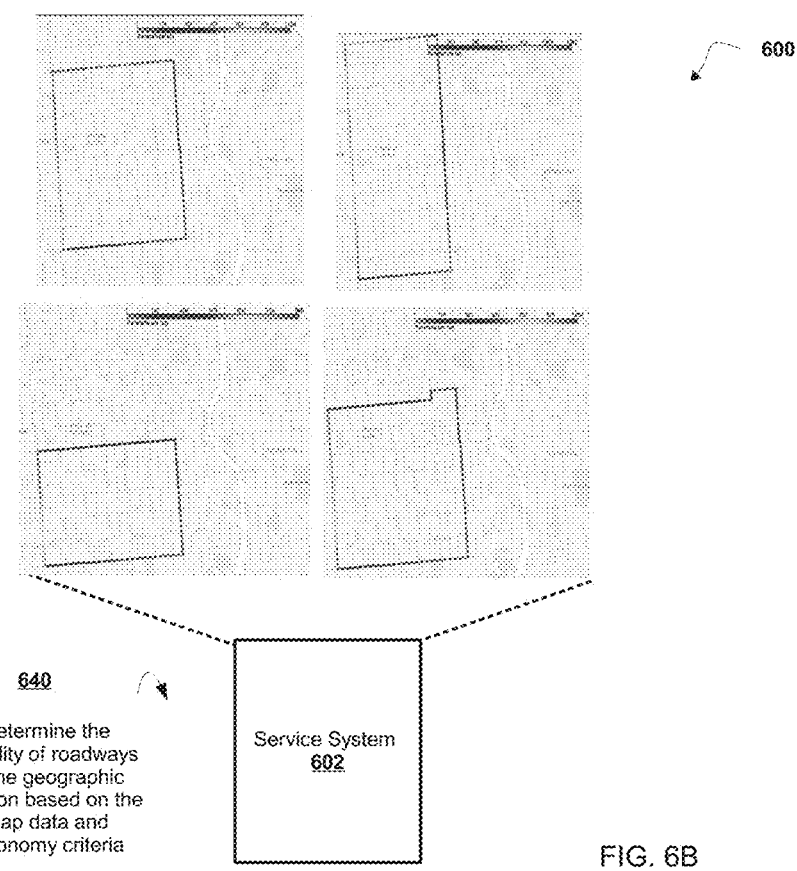

As shown by reference number 640 in FIG. 6B, service system 602 determines the plurality of roadways in the geographic location based on the map data and autonomy criteria. For example, service system 602 filters the map of the geographic location with the autonomy criteria to determine a plurality of roadways from which a canonical route can be generated.

Figure 6C:
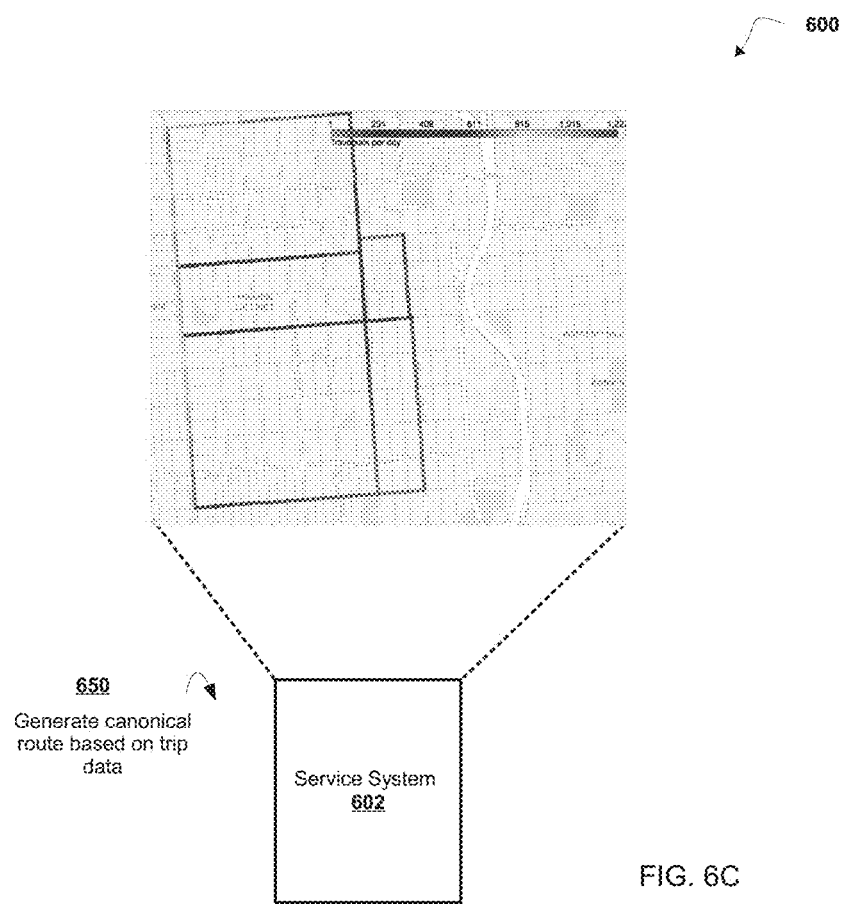

As shown by reference number 650 in FIG. 6C, service system 602 generates a canonical route based on the trip data. For example, service system 602 generates the canonical route including connected roadways in the geographic location by processing the plurality of roadways from which the canonical route can be generated with the trip data. In some non-limiting embodiments, the canonical route comprises at least one roadway connected with another roadway in the plurality of roadways.

Figure 6D:
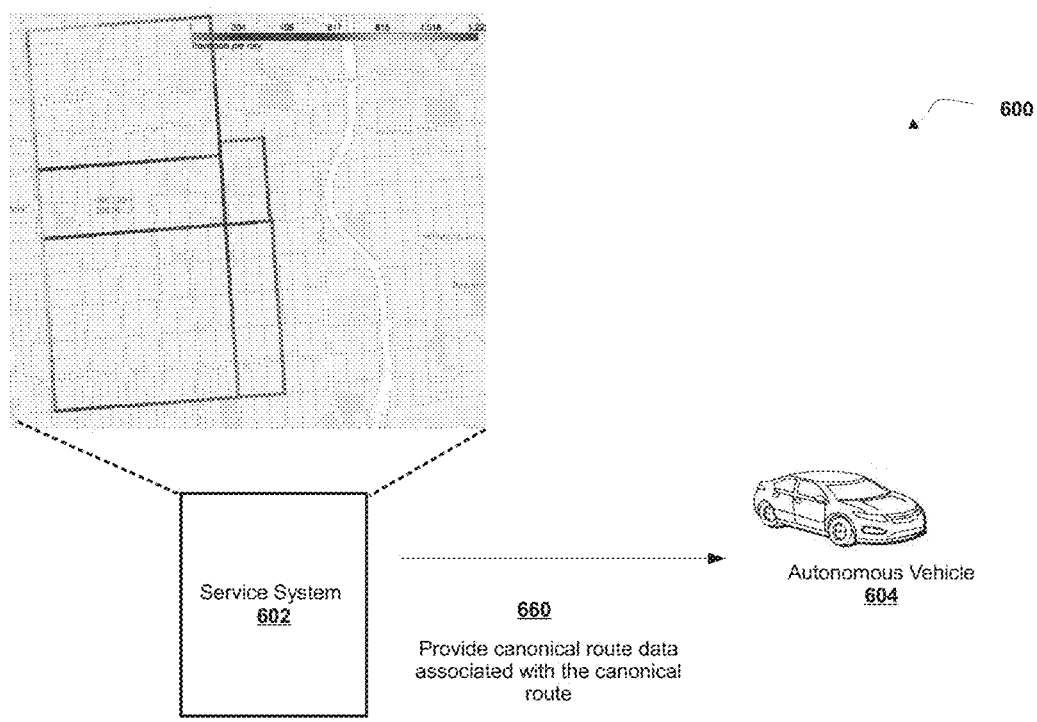

As shown by reference number 660 in FIG. 6D, service system 602 provides canonical route data associated with the canonical route to autonomous vehicle 604. For example, service system 602 transmits the canonical route data to autonomous vehicle 604, and a vehicle controller of autonomous vehicle 604 (e.g., vehicle controller 216) controls one or more vehicle controls of autonomous vehicle 604 (e.g., vehicle controls 218, a device that controls acceleration, a device that controls steering, a device that controls braking, an actuator that controls gas flow, etc.) of autonomous vehicle 604 based on the canonical route data.

Figure 7:
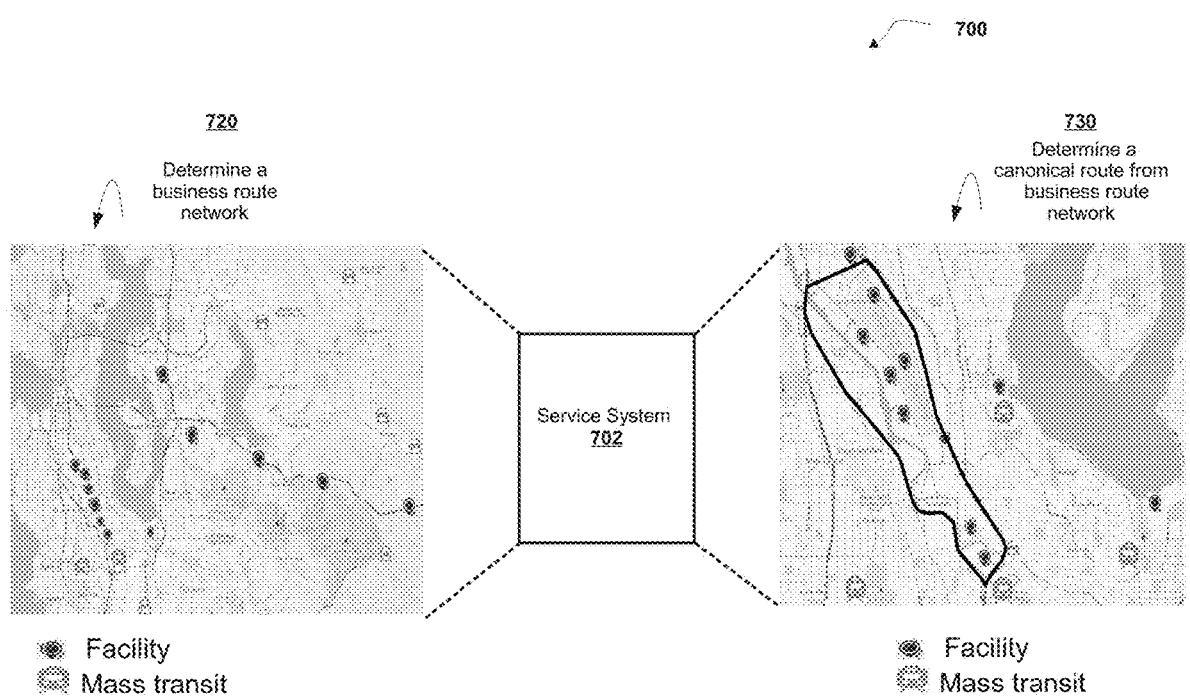
FIG. 7 is a diagram of another implementation of a non-limiting embodiment or aspect of a process disclosed herein.

Referring now to FIG. 7, FIG. 7 is a diagram of an overview of a non-limiting embodiment of an implementation 700 relating to a process for determining a canonical route. As shown in FIG. 7, implementation 700 may include service system 702. In some non-limiting embodiments, service system 702 may be the same or similar to service system 102 and/or service system 602.

As shown by reference number 720 in FIG. 7, service system 702 determines a business route network. In some non-limiting embodiments, a business route network includes one or more routes or roadways associated with one or more entities (e.g., a company, a hospital campus, an employer, etc.). For example, service system 702 determines a geographic location for the business route network based on data associated with the one or more entities, (e.g., based on locations of the one or more entities).

In some non-limiting embodiments, service system 702 determines routes or roadways of the business route network based on the data associated with the one or more entities (e.g., based on commute times of employees associated with an entity, transfers times and/or transfer rates for employees of an entity between facilities of the entity, parking locations relative to a location of an entity, transient population levels at a location of an entity, a location of an entity relative to a transportation hub, a revenue model associated with an entity, a product feature associated with an entity, a threshold monetary return associated with an entity, etc.). In some non-limiting embodiments, service system 702 determines the business route network based on a model that predetermines or predicts a trip value, trip count, or a combination thereof for the business route network based on the data associated with the one or more entities. In some non-limiting embodiments, 702 service system determines the business route network based on maximizing an employee productivity (e.g., a commute time, a transfer time between facilities of an entity, a parking location, etc.), a proximity to a transportation hub, a revenue model associated with an entity, a product feature associated with an entity, a threshold monetary return associated with an entity, or any combination thereof. For example, service system 702 determines the business route network to include routes or roadways associated with higher frequencies of higher value trip counts.

As further shown by reference number 730 in FIG. 7, service system 702 determines a canonical route from the business route network. For example, service system 702 determines the canonical route on one or more routes or roadways in the business route network. In some non-limiting embodiments, service system 702 applies at least one routing determination technique (e.g., as described herein with respect to FIGS. 4 and 5) based on data associated with one or more entities associated with the one or more routes or roadways in the business route network to determine a canonical route in the business route network. For example, the service system 702 can determine the canonical route to maximize (e.g. commute time, transfers between facilities, parking, etc.), proximity to a transportation hub, a revenue model, a product feature, a threshold monetary return, or any combination thereof to determine an initial set of routes or roadways.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. An autonomous vehicle comprising:
   one or more sensors for detecting an object in an environment surrounding the autonomous vehicle; and
   a vehicle computing system comprising one or more processors, wherein the vehicle computing system is programmed or configured to:
   receive canonical route data associated with a canonical route, the canonical route comprising a plurality of interconnected roadways in a geographic location, the plurality of interconnected roadways satisfying at least one condition based on trip data associated with a plurality of trips executed by a plurality of autonomous vehicles, a first trip of the plurality of trips describing a traversal of a first portion of the plurality of roadways in a geographic location by a first autonomous vehicle of the plurality of autonomous vehicles, and a second trip of the plurality of trips describing a traversal of a second portion of the plurality of roadways in the geographic location by a second autonomous vehicle of the plurality of autonomous vehicles, the at least one condition being based at least in part on a proportion of trips from the plurality of trips that are covered by the canonical route; and
   control travel of the autonomous vehicle based on sensor data from the one or more sensors and the canonical route data associated with the canonical route.

2. The autonomous vehicle of claim 1, wherein the trip data comprises at least one of the following:
a number of interventions associated with the plurality of trips by the plurality of autonomous vehicles;
a number of hazards associated with the plurality of trips; or
any combination thereof.

3. The autonomous vehicle of claim 1, wherein the vehicle computing system is further programmed or configured to:
receive the trip data associated with the plurality of trips by the plurality of autonomous vehicles;
generate the canonical route based on the trip data; and
provide the canonical route data associated with the canonical route.

4. The autonomous vehicle of claim 1, wherein the vehicle computing system is further programmed or configured to:
receive map data associated with a map of the geographic location; and
determine the plurality of roadways in the geographic location based on the map data and autonomy criteria, wherein the autonomy criteria is associated with an indication of whether the autonomous vehicle can travel on the plurality of roadways.

5. The autonomous vehicle of claim 1, wherein the vehicle computing system is further programmed or configured to:
determine a subset of roadways of the plurality of roadways associated with trip data that satisfies a threshold value, wherein each roadway of the subset of roadways must be traversed in a route;
determine a shortest path between each pair of roadways of the subset of roadways;
determine a shortest route in the subset of roadways that includes each roadway of the subset of roadways;
determine a shortest route in the plurality of roadways based on an order of the subset of roadways in the shortest route of the subset of roadways and the shortest path between each pair of roadways in the subset of roadways; and
wherein the canonical route comprises roadways in the shortest route in the plurality of roadways.

6. The autonomous vehicle of claim 1, wherein the vehicle computing system is further to:
determine a trimmed set of roadways of the plurality of roadways associated with trip data that satisfies a threshold value, wherein each roadway of the trimmed set of roadways must not be traversed in a route;
determine a subset of roadways based on the trimmed set of roadways, wherein the subset of roadways comprises a largest strongly connected set of roadways remaining after removing the trimmed set of roadways from the plurality of roadways;
determine a shortest path between pairs of roadways in the subset of roadways;
determine, for each of a plurality of random subsets of roadways in the subset of roadways, a shortest route that includes each roadway of that random subset of roadways;
apply an objective function derived based on the trip data to each of the shortest routes determined for each random subset of the plurality of random subsets of roadways to determine an objective function value for that shortest route;
determine a preferred subset of roadways based on the objective function values of the plurality of shortest routes;
determine a shortest route in the plurality of roadways based on an order of the preferred subset of roadways and the shortest path between each pair of roadways in the subset of roadways; and
wherein the canonical route comprises roadways in the shortest route in the plurality of roadways.

7. A method of controlling autonomous vehicle, comprising:
receiving, by a vehicle computing system of the autonomous vehicle, canonical route data associated with a canonical route, the canonical route comprising a plurality of interconnected roadways in a geographic location, the plurality of interconnected roadways satisfying at least one condition derived based on trip data associated with a plurality of trips executed by a plurality of autonomous vehicles, a first trip of the plurality of trips describing a traversal of a first portion of the plurality of roadways in a geographic location by a first autonomous vehicle of the plurality of autonomous vehicles, and a second trip of the plurality of trips describing a traversal of a second portion of the plurality of roadways in the geographic location by a second autonomous vehicle of the plurality of autonomous vehicles, the at least one condition being based at least in part on a proportion of trips from the plurality of trips that are covered by the canonical route; and
controlling, by the vehicle computing system, travel of the autonomous vehicle, the controlling being based on sensor data from one or more sensors of the autonomous vehicle and the canonical route data associated with the canonical route.

8. The method of claim 7, wherein the trip data comprises at least one of the following:
a number of interventions associated with the plurality of trips by the plurality of autonomous vehicles;
a number of hazards associated with the plurality of trips; or
any combination thereof.

9. The method of claim 7, further comprising:
receiving the trip data associated with the plurality of trips by the plurality of autonomous vehicles;
generating the canonical route based on the trip data; and
providing the canonical route data associated with the canonical route.

10. The method of claim 7, further comprising:
receiving map data associated with a map of the geographic location; and
determining the plurality of roadways in the geographic location based on the map data and autonomy criteria, wherein the autonomy criteria is associated with an indication of whether the autonomous vehicle can travel on the plurality of roadways.

11. The method of claim 7, further comprising:
determining a subset of roadways of the plurality of roadways associated with trip data that satisfies a threshold value, wherein each roadway of the subset of roadways must be traversed in a route;
determining a shortest path between each pair of roadways of the subset of roadways;
determining a shortest route in the subset of roadways that includes each roadway of the subset of roadways;
determining a shortest route in the plurality of roadways based on an order of the subset of roadways in the shortest route of the subset of roadways and the shortest path between each pair of roadways in the subset of roadways; and
wherein the canonical route comprises roadways in the shortest route in the plurality of roadways.

12. The method of claim 7, further comprising:
   determining a trimmed set of roadways of the plurality of roadways associated with trip data that satisfies a threshold value, wherein each roadway of the trimmed set of roadways must not be traversed in a route;
   determining a subset of roadways based on the trimmed set of roadways, wherein the subset of roadways comprises a largest strongly connected set of roadways remaining after removing the trimmed set of roadways from the plurality of roadways;
   determining a shortest path between pairs of roadways in the subset of roadways;
   determining, for each of a plurality of random subsets of roadways in the subset of roadways, a shortest route that includes each roadway of that random subset of roadways;
   applying an objective function derived based on the trip data to each of the shortest routes determined for each random subset of the plurality of random subsets of roadways to determine an objective function value for that shortest route;
   determining a preferred subset of roadways based on the objective function values of the plurality of shortest routes;
   determining a shortest route in the plurality of roadways based on an order of the preferred subset of roadways and the shortest path between each pair of roadways in the subset of roadways; and
   wherein the canonical route comprises roadways in the shortest route in the plurality of roadways.

13. A non-transitory computer-readable medium comprising instructions thereon that, when executed by at least one processor, cause the at least one processor to perform operations comprising:
   receiving canonical route data associated with a canonical route, the canonical route comprising a plurality of interconnected roadways in a geographic location, the plurality of interconnected roadways satisfying at least one condition based on trip data associated with a plurality of trips executed by a plurality of autonomous vehicles, a first trip of the plurality of trips describing a traversal of a first portion of the plurality of roadways in a geographic location by a first autonomous vehicle of the plurality of autonomous vehicles, and a second trip of the plurality of trips describing a traversal of a second portion of the plurality of roadways in the geographic location by a second autonomous vehicle of the plurality of autonomous vehicles, the at least one condition being based at least in part on a proportion of trips from the plurality of trips that are covered by the canonical route; and
   controlling travel of the autonomous vehicle, the controlling being based on sensor data from one or more sensors of the autonomous vehicle and the canonical route data associated with the canonical route.

14. The medium of claim 13, wherein the trip data comprises at least one of the following:
   a number of interventions associated with the plurality of trips by the plurality of autonomous vehicles;
   a number of hazards associated with the plurality of trips by the plurality of autonomous vehicles; or
   any combination thereof.

15. The medium of claim 13, the operations further comprising:
   receiving the trip data associated with the plurality of trips by the plurality of autonomous vehicles;
   generating the canonical route based on the trip data; and
   providing the canonical route data associated with the canonical route.

16. The medium of claim 13, the operations further comprising:
   receiving map data associated with a map of the geographic location; and
   determining the plurality of roadways in the geographic location based on the map data and autonomy criteria, wherein the autonomy criteria is associated with an indication of whether the autonomous vehicle can travel on the plurality of roadways.

17. The medium of claim 13, the operations further comprising:
   determining a subset of roadways of the plurality of roadways associated with trip data that satisfies a threshold value, wherein each roadway of the subset of roadways must be traversed in a route;
   determining a shortest path between each pair of roadways of the subset of roadways;
   determining a shortest route in the subset of roadways that includes each roadway of the subset of roadways;
   determining a shortest route in the plurality of roadways based on an order of the subset of roadways in the shortest route of the subset of roadways and the shortest path between each pair of roadways in the subset of roadways; and
   wherein the canonical route comprises roadways in the shortest route in the plurality of roadways.

18. The medium of claim 13, the operations further comprising:
   determining a trimmed set of roadways of the plurality of roadways associated with trip data that satisfies a threshold value, wherein each roadway of the trimmed set of roadways must not be traversed in a route;
   determining a subset of roadways based on the trimmed set of roadways, wherein the subset of roadways comprises a largest strongly connected set of roadways remaining after removing the trimmed set of roadways from the plurality of roadways;
   determining a shortest path between pairs of roadways in the subset of roadways;
   determining, for each of a plurality of random subsets of roadways in the subset of roadways, a shortest route that includes each roadway of that random subset of roadways;
   applying an objective function derived based on the trip data to each of the shortest routes determined for each random subset of the plurality of random subsets of roadways to determine an objective function value for that shortest route;
   determining a preferred subset of roadways based on the objective function values of the plurality of shortest routes;
   determining a shortest route in the plurality of roadways based on an order of the preferred subset of roadways and the shortest path between each pair of roadways in the subset of roadways; and
   wherein the canonical route comprises roadways in the shortest route in the plurality of roadways.

* * * * *